(12) United States Patent
Matsumura et al.

(10) Patent No.: US 11,758,412 B2
(45) Date of Patent: Sep. 12, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Yuichi Kakishima, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 40 days.

(21) Appl. No.: 17/261,321

(22) PCT Filed: Jul. 27, 2018

(86) PCT No.: PCT/JP2018/028342
§ 371 (c)(1),
(2) Date: Jan. 19, 2021

(87) PCT Pub. No.: WO2020/021724
PCT Pub. Date: Jan. 30, 2020

(65) Prior Publication Data
US 2021/0282029 A1 Sep. 9, 2021

(51) Int. Cl.
*H04W 4/00* (2018.01)
*H04W 16/28* (2009.01)
*H04L 27/26* (2006.01)
*H04W 24/10* (2009.01)
*H04W 72/044* (2023.01)
*H04W 72/21* (2023.01)

(52) U.S. Cl.
CPC ......... *H04W 16/28* (2013.01); *H04L 27/2607* (2013.01); *H04W 24/10* (2013.01); *H04W 72/046* (2013.01); *H04W 72/0466* (2013.01); *H04W 72/21* (2023.01)

(58) Field of Classification Search
CPC ...................................... H04W 16/28
See application file for complete search history.

(56) References Cited

U.S. PATENT DOCUMENTS

| | | | |
|---|---|---|---|
| 2015/0288439 A1* | 10/2015 | Kim | H04B 7/0665 375/295 |
| 2017/0094531 A1* | 3/2017 | Kakishima | H04L 5/0048 |
| 2017/0201975 A1* | 7/2017 | Yang | H04L 69/22 |
| 2017/0207845 A1* | 7/2017 | Moon | H04B 7/088 |

(Continued)

FOREIGN PATENT DOCUMENTS

| | | |
|---|---|---|
| JP | 2015-185952 A | 10/2015 |
| KR | 2017-0085428 A | 7/2017 |
| WO | 2017-221202 A1 | 12/2017 |

OTHER PUBLICATIONS

International Search Report issued in Application No. PCT/JP2018/028342, dated Oct. 23, 2018 (4 pages).

(Continued)

*Primary Examiner* — Guang W Li
(74) *Attorney, Agent, or Firm* — Osha Bergman Watanabe & Burton LLP

(57) ABSTRACT

A user terminal according to one aspect of the present disclosure includes: a transmitting section that transmits an uplink signal; and a control section that uses, for the uplink signal, a sequence corresponding to information including whether change of a beam is necessary. According to one aspect of the present disclosure, overhead of a beam report can be reduced appropriately.

3 Claims, 20 Drawing Sheets

(56) References Cited

U.S. PATENT DOCUMENTS

| | | | | |
|---|---|---|---|---|
| 2017/0302341 | A1* | 10/2017 | Yu | H04B 7/0695 |
| 2017/0302355 | A1* | 10/2017 | Islam | H04L 5/0051 |
| 2017/0317808 | A1* | 11/2017 | You | H04L 5/0051 |
| 2019/0140876 | A1* | 5/2019 | Yoshimura | H04B 1/00 |
| 2019/0280734 | A1* | 9/2019 | Park | H04W 72/04 |
| 2020/0107275 | A1* | 4/2020 | Cho | H04W 52/362 |
| 2020/0177424 | A1* | 6/2020 | Noh | H04L 27/26025 |
| 2020/0186210 | A1* | 6/2020 | Park | H04B 7/04 |
| 2020/0236670 | A1* | 7/2020 | Xiong | H04W 72/23 |
| 2020/0245200 | A1* | 7/2020 | Xiong | H04B 7/0626 |
| 2020/0280359 | A1* | 9/2020 | Jung | H04W 72/1284 |
| 2020/0287767 | A1* | 9/2020 | Gao | H04L 1/1607 |
| 2021/0281296 | A1 | 9/2021 | Koskela et al. | |
| 2021/0282029 | A1* | 9/2021 | Matsumura | H04W 24/10 |
| 2022/0123891 | A1* | 4/2022 | Ji | H04L 5/0023 |

OTHER PUBLICATIONS

Written Opinion issued in International Application No. PCT/JP2018/028342, dated Oct. 23, 2018 (4 pages).
3GPP TS 36.300 V8.12.0, Release 8; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2;" Mar. 2010; Sophia Antipolis Valbonne, France (149 pages).
Extended European Search Report issued for Application No. 18927479.8 dated Feb. 17, 2022 (8 pages).
Office Action issued in Indian Application No. 202137003928 dated Oct. 17, 2022 (7 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8 and Rel. 9), and so on, the specifications of LTE-A (LTE-Advanced and LTE Rel. 10 to Rel. 14) have been drafted.

Successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 15" (or later versions), and so on) are also under study.

In existing LTE systems (for example, LTE Rel. 8 to Rel. 14), a user terminal (UE (User Equipment)) periodically and/or aperiodically transmits channel state information (CSI) to a base station. The UE transmits the CSI by using an uplink control channel (PUCCH (Physical Uplink Control Channel)) and/or an uplink shared channel (PUSCH (Physical Uplink Shared Channel)).

CITATION LIST

Non-Patent Literature

Non-Patent Literature 1: 3GPP TS 36.300 V 8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a method of beam management (BM) has been under study. In the beam management, beam selection based on a beam report transmitted by the UE to the base station has been under study.

In NR, the UE may be required to measure a large number of signals for beam measurement and report a large number of beam measurement results. In this case, overhead of the UCI for the beam report is large. Accordingly, increase of power consumption of the UE, reduction of communication throughput, and the like may pose problems.

In the light of this, the present disclosure has an object to provide a user terminal and a radio communication method capable of reducing overhead of a beam report appropriately.

Solution to Problem

A user terminal according to one aspect of the present disclosure includes: a transmitting section that transmits an uplink signal; and a control section that uses, for the uplink signal, a sequence corresponding to information including whether change of a beam is necessary.

Advantageous Effects of Invention

According to one aspect of the present disclosure, overhead of a beam report can be reduced appropriately.

DESCRIPTION OF EMBODIMENTS (CSI)

Figure 1:
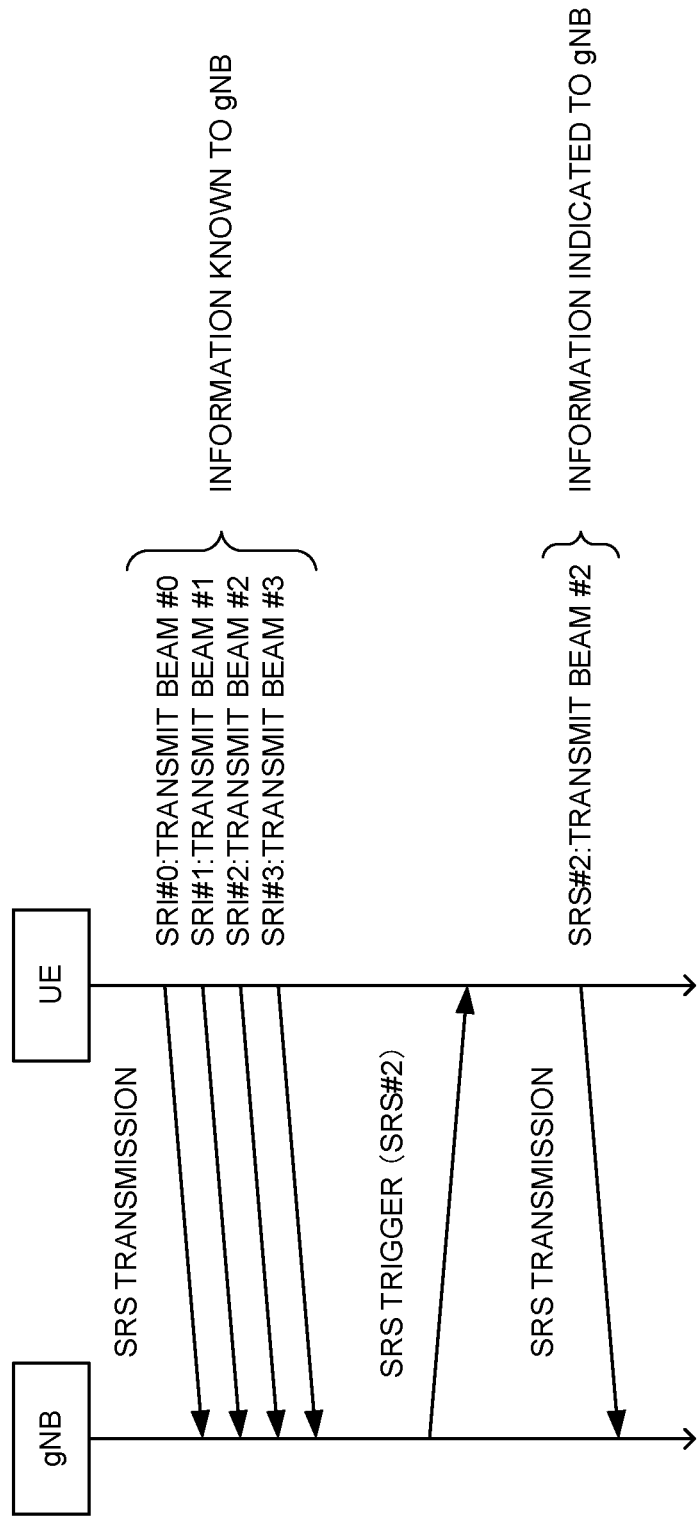
FIG. 1 is a diagram to show an example of operation of UL beam management.

In NR, the UE measures a channel state by using a certain reference signal (or a resource for the reference signal), and feeds back (reports) channel state information (CSI) to the base station.

The UE may measure the channel state by using a channel state information reference signal (CSI-RS), a synchronization signal/broadcast channel (SS/PBCH) block, a synchronization signal (SS), a demodulation reference signal (DMRS), or the like.

A CSI-RS resource may include at least one of a non zero power (NZP) CSI-RS and CSI-IM (Interference Management). The SS/PBCH block is a block including a synchronization signal (for example, a primary synchronization signal (PSS) and a secondary synchronization signal (SSS)), and a PBCH (and its corresponding DMRS), and may be referred to as an SS block or the like.

Note that the CSI may include at least one of a channel quality indicator (CQI), a precoding matrix indicator (PMI), a CSI-RS resource indicator (CRI), an SS/PBCH block resource indicator (SSBRI (SS/PBCH Block Indicator)), a layer indicator (LI), a rank indicator (RI), L1-RSRP (reference signal received power in layer 1 (Layer 1 Reference Signal Received Power)), L1-RSRQ (Reference Signal Received Quality), an L1-SINR (Signal to Interference plus Noise Ratio), an L1-SNR (Signal to Noise Ratio), and the like.

The CSI may include a plurality of parts. The first part of the CSI (CSI part 1) may include information (for example, the RI) having a relatively small number of bits. The second part of the CSI (CSI part 2) may include information (for example, the CQI) having a relatively large number of bits, such as information determined based on CSI part 1.

As a feedback method of the CSI, (1) a periodic CSI (P-CSI) report, (2) an aperiodic CSI (A-CSI) report, (3) a semi-persistent CSI (SP-CSI (Semi-Persistent CSI)) report, and the like have been under study.

Information related to a resource for the report of the CSI of at least one of the P-CSI, the SP-CSI, and the A-CSI (which may be referred to as CSI report configuration information) may be reported to the UE by using higher layer signaling, physical layer signaling (for example, downlink control information (DCI)) or a combination of these.

Here, the higher layer signaling may be, for example, any one of RRC (Radio Resource Control) signaling, MAC (Medium Access Control) signaling, broadcast information, and so on, or a combination of these.

The MAC signaling may use, for example, a MAC control element (MAC CE), a MAC PDU (Protocol Data Unit), or the like. For example, the broadcast information may be master information blocks (MIBs), system information blocks (SIBs), minimum system information (RMSI (Remaining Minimum System Information)), other system information (OSI), and the like.

The CSI report configuration information may include, for example, information related to a report period, an offset, and the like, and these may be represented in a certain time unit (a slot unit, a subframe unit, a symbol unit, or the like). The CSI report configuration information may include a configuration ID (CSI-ReportConfigId), and a type of a CSI report method (whether or not it is SP-CSI, for example) and a parameter such as the report period may be identified using the configuration ID. The CSI report configuration information may include information (CSI-ResourceConfigId) indicating which reference signal (or resource for which reference signal) is used to report the measured CSI. (QCL/TCI)

In NR, the following has been under study: the UE controls reception processing (for example, demapping, demodulation, decoding, receive beamforming, and the like) and transmission processing (for example, mapping, modulation, coding, precoding, transmit beamforming, and the like) of the channel, based on information (QCL information) related to quasi-co-location (QCL) of the channel (for example, a downlink control channel (PDCCH (Physical Downlink Control Channel)), a PDSCH, a PUCCH, or the like).

Here, QCL is an indicator indicating statistical properties of the channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (Spatial Rx Parameter)) is the same (QCL is established with respect to at least one of these) between such a plurality of different signals/channels.

Note that the spatial reception parameter may correspond to a receive beam of the UE (for example, a receive analog beam), and the beam may be identified based on spatial QCL. The QCL (or at least one element with QCL being established) in the present disclosure may be interpreted as sQCL (spatial QCL).

For the QCL, a plurality of types (QCL types) may be defined. For example, four QCL types A to D may be provided, which have different parameters (or parameter sets) that can be assumed to be the same, and such parameters are described below:

QCL type A: Doppler shift, Doppler spread, average delay, and delay spread
QCL type B: Doppler shift and Doppler spread
QCL type C: Average delay and Doppler shift
QCL type D: Spatial reception parameter A TCI state (TCI-state) may indicate (may include) QCL information. The TCI state (and/or the QCL information) may be, for example, information related to QCL between a channel as a target (or a reference signal (RS) for the channel) and another signal (for example, another downlink reference signal (DL-RS)), and may include, for example, at least one of information related to the DL-RS to be in a QCL relationship (DL-RS-related information) and information (QCL type information) indicating the QCL type.

The DL-RS-related information may include at least one of information indicating the DL-RS to be in a QCL relationship and information indicating a resource of the DL-RS. For example, when a plurality of reference signal sets (RS sets) are configured for the UE, the DL-RS-related information may indicate at least one of the DL-RS having a QCL relationship with a channel (or a port for the channel) out of the RSs included in the RS sets, a resource for the DL-RS, and the like.

Here, at least one of the RS for the channel and the DL-RS may be at least one of a synchronization signal, a PBCH, an SS/PBCH block, a CSI-RS, a DMRS, a mobility reference signal (MRS (Mobility RS)), a beam-specific signal, and the like, or a signal configured by, for example, enhancing or modifying these (for example, a signal configured by modifying at least one of density and a period).

Information related to the QCL between the PDCCH (or a DMRS antenna port related to the PDCCH) and a certain DL-RS may be referred to as a TCI state for the PDCCH or the like.

The UE may determine the TCI state for a UE-specific PDCCH (CORESET), based on RRC signaling and the MAC CE.

For example, one or a plurality of (K) TCI states may be configured for the UE for each CORESET by using higher layer signaling (ControlResourceSet information element). The UE may activate each of the one or a plurality of TCI states for each CORESET by using the MAC CE. The MAC CE may be referred to as a TCI state indication MAC CE for UE-specific PDCCH (TCI State Indication for UE-specific PDCCH MAC CE). The UE may perform monitoring of the CORESET, based on an active TCI state corresponding to the CORESET.

The TCI state may correspond to a beam. For example, the UE may assume that the PDCCHs of different TCI states are transmitted by using different beams.

Information related to the QCL between the PDSCH (or a DMRS antenna port related to the PDSCH) and a certain DL-RS may be referred to as a TCI state for the PDSCH or the like.

M (M≥1) TCI states for the PDSCH (M pieces of QCL information for the PDSCH) may be reported to (configured for) the UE by using higher layer signaling. Note that the number M of TCI states configured for the UE may be restricted by at least one of UE capability and the QCL type.

The DCI used for scheduling of the PDSCH may include a certain field indicating the TCI state (QCL information for the PDSCH) (which may be referred to as, for example, a field for the TCI, a TCI field, a TCI state field, or the like). The DCI may be used for scheduling of the PDSCH of a single cell, and may be referred to as, for example, DL DCI, DL assignment, DCI format 1_0, DCI format 1_1, or the like.

When the DCI includes a TCI field of x bits (for example, x=3), the base station may configure a maximum of $2^x$ (8 when x=3, for example) types of TCI states for the UE in advance by using higher layer signaling. The value of the TCI field (TCI field value) in the DCI may indicate one of the TCI states configured in advance by using higher layer signaling.

When more than eight types of TCI states are configured for the UE, eight or less types of TCI states may be activated (or specified) by using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated by using the MAC CE.

The UE may determine the QCL of the PDSCH (or a DMRS port of the PDSCH), based on the TCI state indicated by the TCI field value in the DCI. For example, the UE may control reception processing of the PDSCH (for example, decoding, demodulation, and the like), assuming that the DMRS port (or a DMRS port group) of the PDSCH of a serving cell is in QCL with the DL-RS corresponding to the TCI state reported by using the DCI.

Regarding the PUCCH, what corresponds to the TCI state may be expressed as spatial relation. In Rel-15 NR, spatial relation information between a certain RS and the PUCCH can be included in PUCCH configuration information (PUCCH-Config information element) of RRC. The certain RS is at least one of an SSB, a CSI-RS, and a reference signal for measurement (SRS (Sounding Reference Signal)).

When the spatial relation information related to the SSB or the CSI-RS and the PUCCH is configured, the UE may transmit the PUCCH by using a spatial domain filter the same as the spatial domain filter for reception of the SSB or the CSI-RS. In other words, in this case, the UE may assume that a UE receive beam of the SSB or the CSI-RS and a UE transmit beam of the PUCCH are the same.

When the spatial relation information related to the SRS and the PUCCH is configured, the UE may transmit the PUCCH by using a spatial domain filter the same as the spatial domain filter for transmission of the SRS. In other words, in this case, the UE may assume that a UE transmit beam of the SRS and a UE transmit beam of the PUCCH are the same.

When more than one piece of spatial relation information related to the PUCCH is configured, control is performed so that a single PUCCH spatial relation is activated for a single PUCCH resource at certain time, by using PUCCH spatial relation activation/deactivation MAC CE.

The MAC CE may include information such as a serving cell ID, a BWP ID, and a PUCCH resource ID to be applied.

Note that a spatial domain filter for transmission of the base station, a downlink spatial domain transmission filter, and a transmit beam of the base station may be interpreted interchangeably. A spatial domain filter for reception of the base station, an uplink spatial domain receive filter, and a receive beam of the base station may be interpreted interchangeably.

A spatial domain filter for transmission of the UE, an uplink spatial domain transmission filter, and a transmit beam of the UE may be interpreted interchangeably. A spatial domain filter for reception of the UE, a downlink spatial domain receive filter, and a receive beam of the UE may be interpreted interchangeably.

(Beam Management)

Incidentally, thus far, in Rel-15 NR, a method of beam management (BM) has been under study. In the beam management, an operation in which beam selection is performed based on L1-RSRP reported by the UE has been under study. "To change (switch) the beams of a certain signal/channel" corresponds to "to change the TCI states (QCL) of the signal/channel,"

Note that the beam selected in beam selection may be a transmit beam (Tx beam) or may be a receive beam (Rx beam). The beam selected in beam selection may be a beam of the UE or may be a beam of the base station.

The UE may report (transmit) measurement results for the beam management by using the PUCCH or the PUSCH. The measurement results may be, for example, the CSI including at least one of the L1-RSRP, the L1-RSRQ, the L1-SINR, the L1-SNR, and the like. The measurement results may be referred to as beam measurement, beam measurement results, a beam report, a beam measurement report, or the like.

CSI measurement for the beam report may include interference measurement. The UE may derive the beam report by measuring channel quality, interference, or the like by using a resource for CSI measurement. The resource for CSI measurement may be, for example, at least one of a resource of the SS/PBCH block, a resource of the CSI-RS, another reference signal resource, and the like. Configuration information of a CSI measurement report may be configured for the UE by using higher layer signaling.

In the beam report, results of at least one of the channel quality measurement and the interference measurement may be included. The results of the channel quality measurement may include, for example, the L1-RSRP. The results of the interference measurement may include the L1-SINR, the L1-SNR, the L1-RSRQ, another indicator related to interference (for example, any indicator other than the L1-RSRP), or the like.

Note that the resource for CSI measurement for beam management may be referred to as a resource for beam measurement. A signal/channel of the CSI measurement target may be referred to as a signal for beam measurement. The CSI measurement/report may be interpreted as at least one of a measurement/report for beam management, a beam measurement/report, a radio link quality measurement/report, and the like.

The configuration information of the CSI measurement (for example, CSI-MeasConfig or CSI-ResourceConfig)

may include information such as one or more non zero power (NZP) CSI-RS resource sets (NZP-CSI-RS-ResourceSet) for CSI measurement, one or more zero power (ZP) CSI-RS resource sets (ZP-CSI-RS-ResourceSet) (or CSI-IM (Interference Management) resource sets (CSI-IM-ResourceSet)), and one or more SS/PBCH block resource sets (CSI-SSB-ResourceSet).

Information of each resource set may include information related to repetition in the resources in the resource set. The information related to the repetition may indicate, for example, 'on' or 'off.' Note that 'on' may be expressed as 'enabled (or valid),' and 'off' may be expressed as 'disabled (or invalid).'

For example, regarding the resource set in which the repetition is configured to be 'on,' the UE may assume that the resources in the resource set are transmitted by using the same downlink spatial domain transmission filter. In this case, the UE may assume that the resources in the resource set are transmitted by using the same beam (for example, by using the same beam from the same base station).

Regarding the resource set in which the repetition is configured to be 'off,' the UE may perform control that the UE must not assume (or need not assume) that the resources in the resource set are transmitted by using the same downlink spatial domain transmission filter. In this case, the UE may assume that the resources in the resource set are not transmitted by using the same beam (are transmitted by using a different beam). In other words, regarding the resource set in which the repetition is configured to be 'off,' the UE may assume that the base station performs beam sweeping.

Incidentally, in NR, a configuration of including a plurality of measurement results in the beam report has been under study. The following has been under study: the UE measures a maximum of 64 beams, and reports a configured number of beams in a single report instance.

The following has been under study: the UE for which a group-based beam report is configured to be enabled by using a higher layer parameter (for example, an RRC parameter "groupBasedBeamReporting") includes a plurality of resource IDs for beam measurement (for example, SSBRIs and CRIs) and a plurality of measurement results (for example, the L1-RSRPs) corresponding to these in the beam report for each report configuration.

The following has been under study: the UE for which one or more report target RS resource numbers are configured by using a higher layer parameter (for example, an RRC parameter "nrofReportedRS") includes one or more resource IDs for beam measurement and one or more measurement results (for example, the L1-RSRPs) corresponding to these in the beam report for each report configuration.

(SRS)

A configuration that a UL RS has the following functions has been under study.
UL CSI acquisition
DL CSI acquisition
Beam management For an NR SRS, the following characteristics have been under study.
(1) Reuse of LTE SRS Sequence and Multiplex Method
    ZC (Zadoff-Chu) sequence having a scheduled bandwidth
    Comb 2 (the SRS is mapped to one RE at intervals of two REs) or comb 4 (the SRS is mapped to one RE at intervals of four REs), and IFDMA (Interleaved Frequency Division Multiple Access) including a cyclic shift (CS)
(2) Use a larger number of symbols for the SRS in order to increase capacity (the last six symbols in a slot)
(3) Support of BWP (BandWidth Part) switch, CC (Component Carrier) switch, and antenna switch
(4) Support of SRS precoding with or without channel reciprocity (vertical symmetric property)
    Without channel reciprocity: The SRS precoding is indicated by an SRI (SRS Resource Indicator) (corresponding to another SRS)
    With channel reciprocity: The SRS precoding may be indicated by a CRI (CSI-RS Resource Indicator) (corresponding to a DL RS)
(5) Support of inter-slot and intra-slot frequency hopping
(6) Support of P/A/SP RS transmission
(Beam Correspondence)

Beam correspondence (vertical symmetric property) on the UE side may be UE capability.

Whether or not the UE supports the beam correspondence affects design of UL beam management. When the beam correspondence is maintained, transmission of a plurality of beams of the UL depends mainly on DL beam management. When the beam correspondence is not maintained, transmission of a plurality of beams of the UL requires UL beam management.

(UL Beam Management)

The following has been under study: in a case without the beam correspondence, the UE transmits the SRS by using the same transmit beam over a plurality of symbols for the sake of UL beam management. The following has been under study: in a case without the beam correspondence and when application of the same transmit beam over some of the SRS resources in an SRS resource set is not configured for the UE, the UE transmits the SRS by using a different transmit beam.

In a case with or without the beam correspondence, the UE receives a beam indication for the PUCCH by using PUCCH spatial relation information (PUCCH spatial-relation-info) being a higher layer (RRC) parameter. When PUCCH spatial-relation-info includes one spatial relation information (SpatialRelationInfo) information element (IE), the UE applies configured SpatialRelationInfo. When PUCCH spatial-relation-info includes more than one SpatialRelationInfo IE, the UE applies SpatialRelationInfo configured by using the MAC CE.

In a case with or without the beam correspondence, the UE receives a beam indication for the PUSCH by using an SRI (SRS Resource Indicator) in DCI.

For example, as shown in FIG. 1, for the UE, transmit beams #0, #1, #2, and #3 are indicated by SRIs #0, #1, #2, and #3, respectively (beamforming known to the gNB (gNB-transparent beamforming)). The UE transmits the SRS by using each of the transmit beams #0, #1, #2, and #3. Subsequently, for example, when transmit beam #2 is indicated by SRI #2 for the UE from the gNB from which the SRS is received, the UE transmits the SRS by using transmit beam #2 (beamforming indicated by the gNB (gNB-indicated beamforming)).

To determine at least one of the transmit beam and the receive beam of the gNB, a beam report of the UE is required. In Rel. 15, a configuration that the UE reports the L1-RSRP as a part of the CSI report has been under study.

However, overhead of the beam report is large. When a report of the L1-RSRP is configured for the UE, it is conceivable that the UE reports the L1-RSRP on the PUCCH or the PUSCH. Overhead of the UCI for the beam report is large. Accordingly, increase of power consumption of the UE, reduction of communication throughput, and the like may pose problems.

In the light of this, the inventors of the present invention came up with the idea of a method for reducing overhead of a beam report.

The UE may report whether or not change of beams is necessary. The beam may be any one of a base station transmit beam, a base station receive beam, a UE transmit beam, and a UE receive beam.

According to one aspect of the present disclosure, overhead of the beam report can be reduced. Consequently, a battery can be saved. When the beam report is multiplexed on other UCI, a coding rate of such other UCI can be lowered. When the gNB can be informed that the UE does not transmit the beam report in a certain resource, the resource can be allocated for other purposes. Consequently, resource use efficiency can be enhanced.

In the following, embodiments according to the present disclosure will be described in detail with reference to the drawings. The radio communication method according to each embodiment may be applied individually, or may be applied in combination.

Note that, in the present disclosure, "to assume" may signify that reception processing, transmission processing, measurement processing, and the like are performed by assuming.

(Radio Communication Method)
<Aspect 1>

In aspect 1, the UE reports whether or not beam change (switch) is necessary by using 1-bit information.

The 1-bit information "0" may indicate that the beam change is not necessary. The 1-bit information "1" may indicate that the beam change is necessary.

The UE may transmit the 1-bit information in accordance with any one of the following aspects 1-1, 1-2, and 1-3.
{{Aspect 1-1}}

The UE may transmit the 1-bit information by using sequence selection in the UL channel (for example, any one of the PUCCH, the PUSCH, and the SRS).

The UE may transmit the 1-bit information by using a sequence (specific sequence) of any one of the following aspects 1-1-a and 1-1-b.
<<Aspect 1-1-a>>

The specific sequence may be based on at least one of a sequence index and a CS index. The specific sequence may be a sequence used for at least one of PUCCH formats 0, 1, 3, and 4 of NR, or may be a DMRS sequence used for the PUCCH or the PUSCH. The specific sequence may be a CAZAC (Constant Amplitude Zero Auto Correlation) sequence or a low PAPR (Peak-to-Average Power Ratio) sequence. The specific sequence may be defined by a cyclic shift (which is indicated by the CS index) of a base sequence (which is indicated by the sequence index).

The UE may determine the specific sequence in accordance with any one of the following aspects 1-1-a-1 and 1-1-a-2.
{{{{Aspect 1-1-a-1}}}}

For the UE, at least one parameter of the sequence index and the CS index is configured. For the UE, the parameter may be configured by using higher layer signaling. The UE determines two sequences based on the parameter in accordance with a rule configured in advance (the UE derives the two sequences or the two sequences are implicitly configured for the UE). The UE may determine one sequence based on the parameter, and determine other sequences in accordance with the parameter and the rule.

The UE may determine one of the two sequences as the specific sequence in accordance with the 1-bit information to be transmitted.

For the UE, the CS index (initial CS index, for example, $m_0$) may be configured by using higher layer signaling. The UE may determine the first CS index based on the sum of the initial CS index and a certain first value (CS derivation parameter, for example, $m_{CS}$), and determine the second CS index based on the sum of the initial CS index and a certain second value (CS derivation parameter, for example, $m_{CS}$). The second value may be a value obtained by adding 6 to the first value.

Figure 2A:
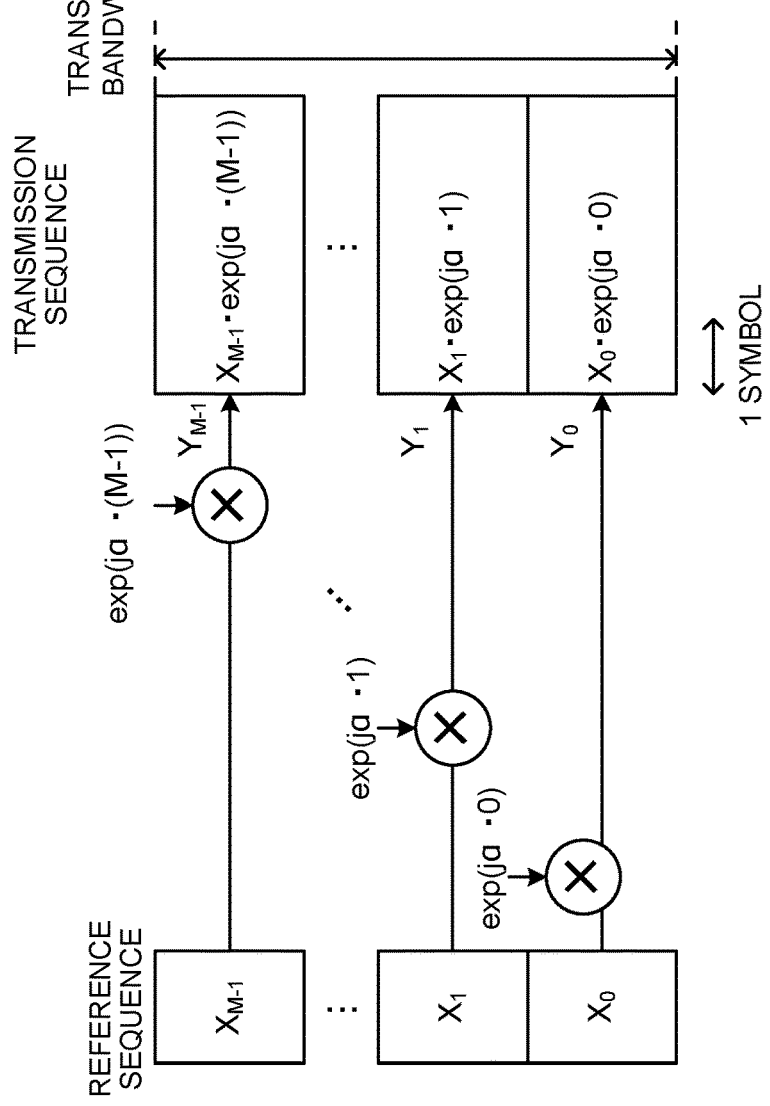
FIG. 2A and FIG. 2B are each a diagram to show an example of CSs for multiplex of 1-bit information.

As shown in FIG. 2A, regarding the UE, when the transmission bandwidth includes M subcarriers (Resource Elements (REs)), the UE generates a transmission sequence by applying a cyclic shift based on a cyclic shift (CS, phase rotation) index to a reference sequence (base sequence) $X_0$, $X_1$, ..., $X_{M-1}$ having a sequence length of M.

For example, regarding the UE, when the transmission bandwidth is one PRB and includes 12 REs, the UE generates a specific sequence by applying a cyclic shift based on one of the first CS index and the second CS index to a reference sequence $X_0$, $X_1$, ..., $X_{11}$ having a sequence length of 12.

Figure 2B:
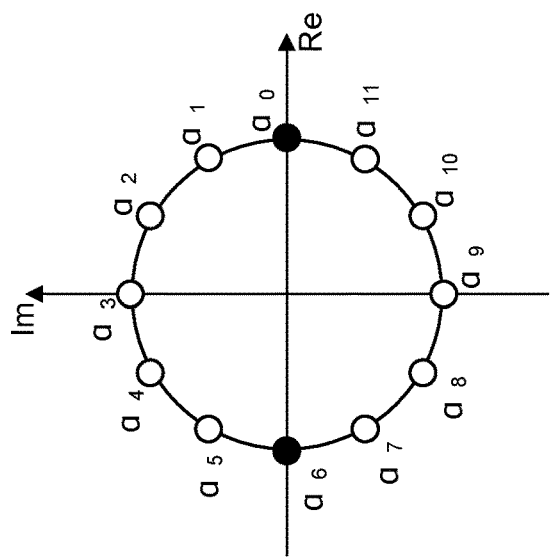

As shown in FIG. 2B, the interval between the first CS index and the second CS index may be 6. In other words, the interval between the phase rotation corresponding to the first CS index and the phase rotation corresponding to the second CS index may be n. For example, the first CS index may be 0 (phase rotation thereof may be $\alpha_0$), and the second CS index may be 6 (phase rotation thereof may be ad.

In this case, provided that the specific sequence is $Y_0$, $Y_1$, ..., $Y_{11}$, regarding certain elements $Y_0$, $Y_2$, $Y_4$, ..., $Y_{10}$ having even-numbered RE indices, values of certain elements based on the first CS index and values of certain elements based on the second CS index are the same. In other words, the values of the certain elements do not depend on the first CS index and the second CS index.

Figure 3A:
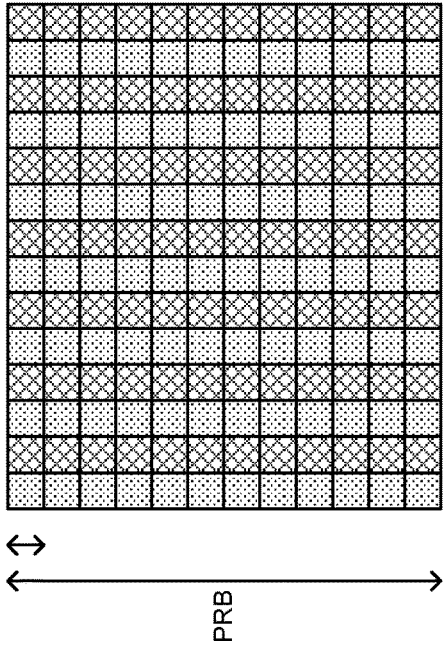
FIG. 3A and FIG. 3B are each a diagram to show an example of time/frequency resources of 1-bit information.
Figure 3A:
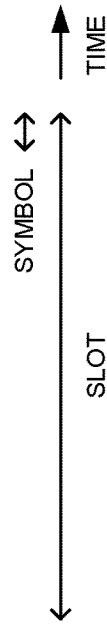

As shown in FIG. 3A, the UE may use a DMRS of DMRS type 1 (having a comb-like structure) for the PUSCH as the specific sequence. The UE may transmit the DMRS in symbol #2 out of symbols #0 to #13 in one slot. The UE may transmit the DMRS in REs #0, #2, ... #10 having even-numbered RE indices out of REs #0 to #11 in one PRB. In this case, the DMRS sequence length is 6, and thus the UE may map a specific sequence $Y_0$, $Y_1$, ..., $Y_5$ to REs #0, #2, ... #10.

Figure 3B:
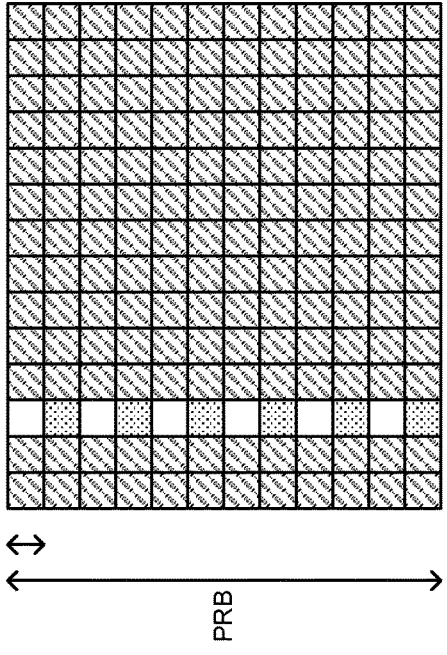
Figure 3B:
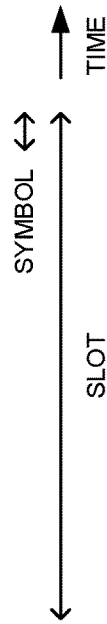

As shown in FIG. 3B, the UE may transmit the specific sequence in at least any one of a symbol of the DMRS and a symbol of the UCI. The UE may use the DMRS for PUCCH format 1 as the specific sequence, or may use a sequence to be multiplied to the UCI as the specific sequence.

When the resource of the UL channel (the PUSCH or the PUCCH) includes DMRS symbols and data (UCI or UL data) symbols, the UE may transmit the 1-bit information in accordance with one of the following transmission methods 1 and 2.

[Transmission Method 1]

When the UE transmits the 1-bit information in the DMRS symbol, the UE transmits the 1-bit information by using the specific sequence (sequence selection). When the UE transmits the 1-bit information in the data symbol, the UE does not transmit the 1-bit information by using the specific sequence (sequence selection).

[Transmission Method 2]

When the UE transmits the 1-bit information in the DMRS symbol, the UE does not transmit the 1-bit information by using the specific sequence (sequence selection). When the UE transmits the 1-bit information in the data symbol, the UE transmits the 1-bit information by using the specific sequence (sequence selection).

The gNB may decode the 1-bit information in accordance with any one of the following aspects 1-1-a-2-1, 1-1-a-2-2, and 1-1-a-2-3.

<<<Aspect 1-1-a-2-1>>>

Figure 4:
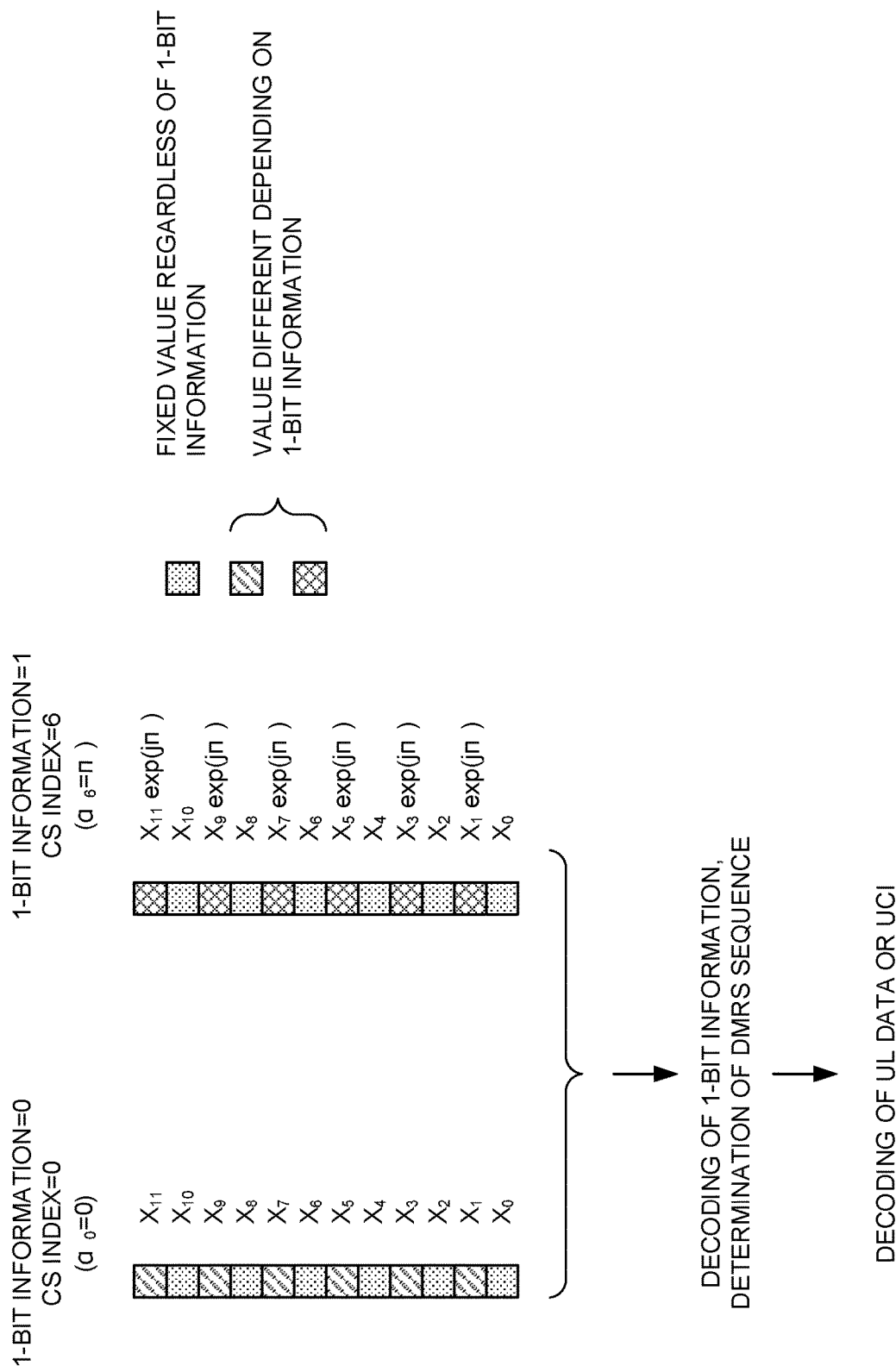
FIG. 4 is a diagram to show an example of a reception operation of a base station.

As shown in FIG. 4, the gNB may generate two DMRS sequence replicas corresponding to respective pieces of the 1-bit information "0" and "1". The gNB may calculate correlation between each of the two replicas and a received signal of the DMRS, and determine the 1-bit information corresponding to the replica having the higher correlation (having the highest likelihood) out of the two replicas (maximum likelihood detection (MLD)).

The gNB may determine the replica having higher correlation as the DMRS sequence. The gNB may perform channel estimation based on the determined DMRS sequence and received signal, and decode the UL data in the PUSCH or the UCI in the PUCCH based on a channel estimation result.

<<<Aspect 1-1-a-2-2>>>

Figure 5:
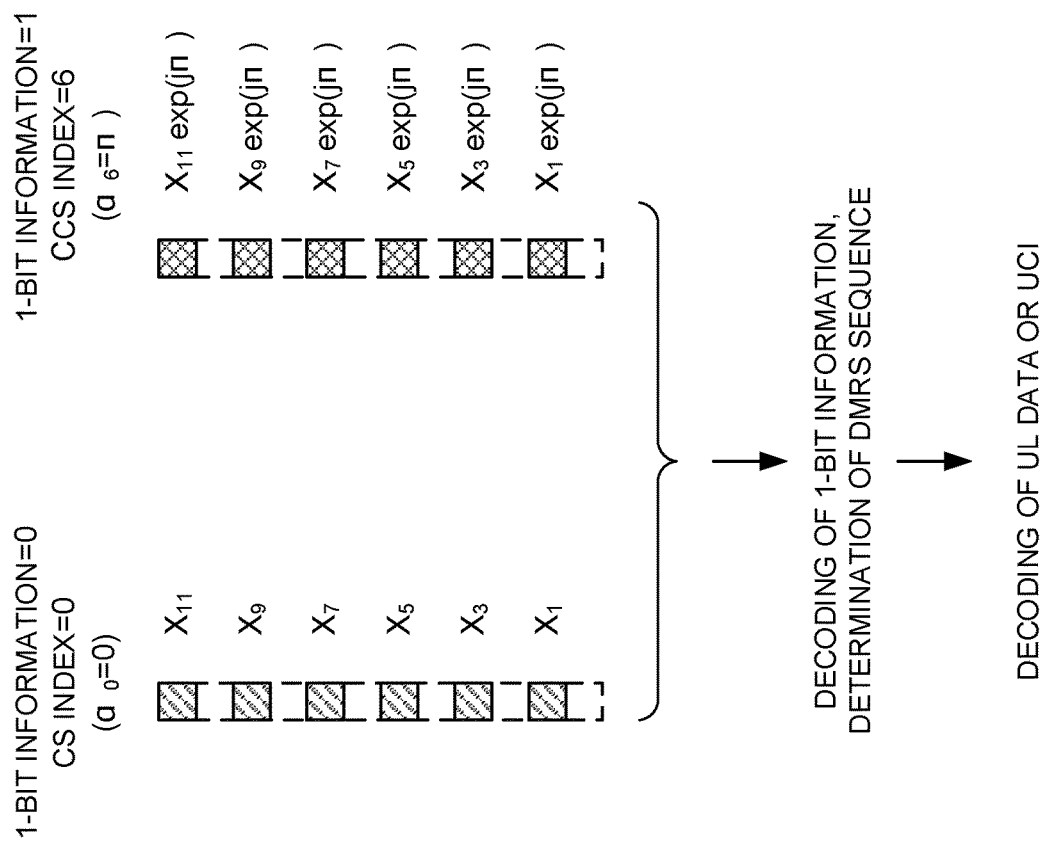
FIG. 5 is a diagram to show another example of a reception operation of the base station.

In the two DMRS sequences corresponding to the respective pieces of the 1-bit information "0" and "1", the interval between the CSs is π (the interval between the CS indices is 6), and thus elements $Y_0, Y_2, \ldots Y_{10}$ having even-numbered RE indices (specific elements of the frequency resources) have fixed values regardless of the 1-bit information (CS index). As shown in FIG. 5, elements $Y_1, Y_3, \ldots Y_{11}$ having odd-numbered RE indices are different depending on the 1-bit information.

Regarding a partial sequence (sequence length 6) consisting of the elements having odd-numbered RE indices, the gNB may generate two partial sequence replicas corresponding to the respective pieces of the 1-bit information "0" and "1". The gNB may calculate correlation between the elements having odd-numbered RE indices of the received signal and each of the two replicas, and determine the 1-bit information corresponding to the replica having the higher correlation out of the two replicas.

The gNB may determine the sequence (sequence length 12) of all the REs for the 1-bit information as the DMRS. The gNB may perform channel estimation based on the determined DMRS sequence and received signal, and decode the UL data in the PUSCH or the UCI in the PUCCH based on a channel estimation result.

<<<Aspect 1-1-a-2-3>>>

Figure 6:
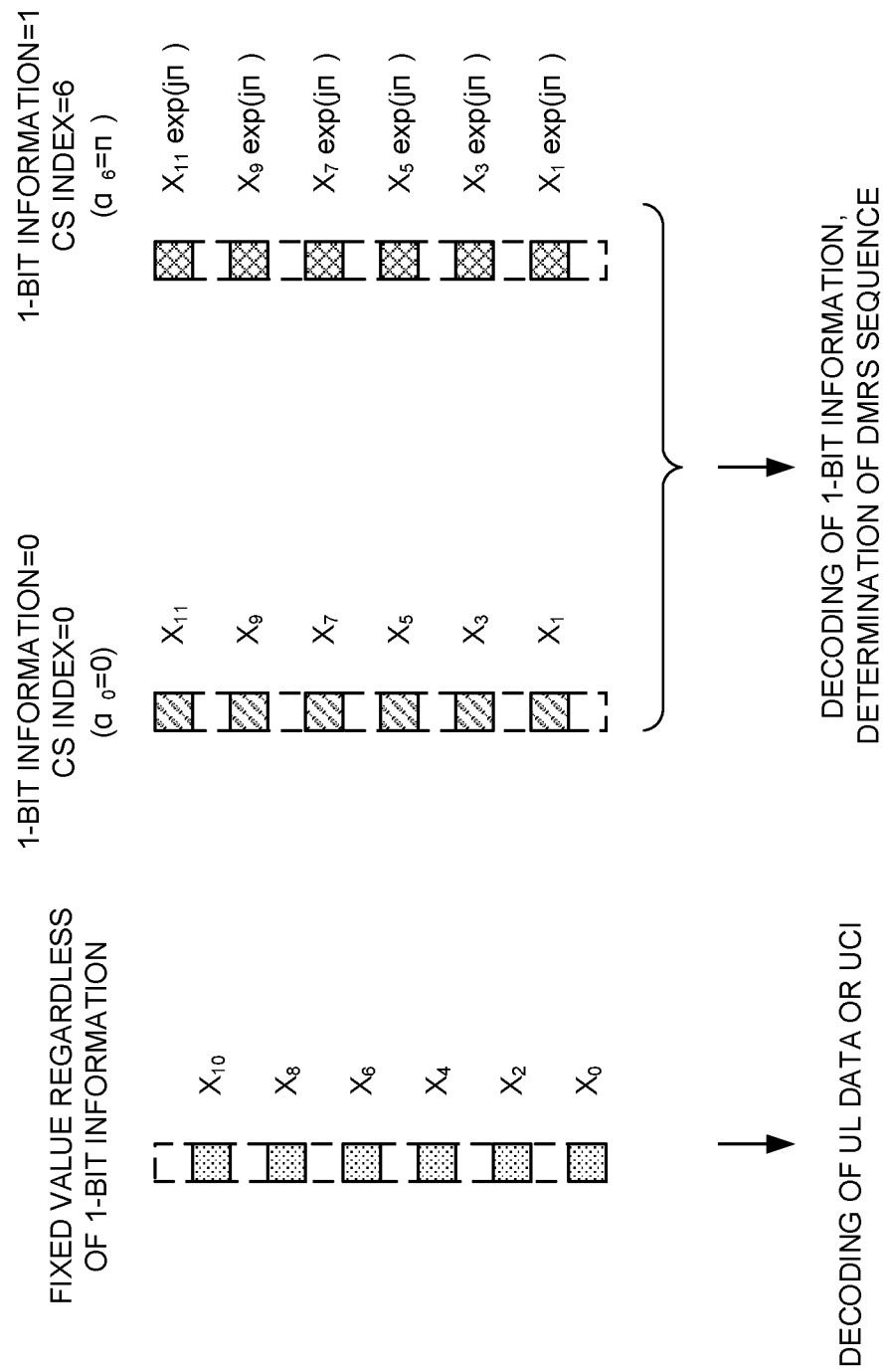
FIG. 6 is a diagram to show still another example of a reception operation of the base station.

As shown in FIG. 6, in the two DMRS sequences corresponding to the respective pieces of the 1-bit information "0" and "1", the elements having even-numbered RE indices $Y_0, Y_2, \ldots Y_{10}$ have fixed values regardless of the 1-bit information (CS index). In view of this, the gNB may perform channel estimation based on the elements having even-numbered RE indices (sequence length 6) out of the DMRS sequence and the elements having even-numbered RE indices out of the received signal, and decode the UL data in the PUSCH or the UCI in the PUCCH based on a channel estimation result.

Further, regarding the partial sequence (sequence length 6) consisting of the elements having odd-numbered RE indices, the gNB may generate two partial sequence replicas corresponding to the respective pieces of the 1-bit information "0" and "1". The gNB may calculate correlation between the elements having odd-numbered RE indices of the received signal and each of the two replicas, and determine the 1-bit information corresponding to the replica having the higher correlation out of the two replicas.

According to aspect 1-1-a-2-3 described above, in comparison to aspects 1-1-a-2-1 and 1-1-a-2-2, density of the DMRS in the frequency domain is reduced to the half. Thus, in an environment in which frequency selectivity is difficult, channel estimation accuracy is deteriorated and data decoding accuracy is deteriorated. In contrast, in aspects 1-1-a-2-1 and 1-1-a-2-2, errors in determination of the 1-bit information affect data (UL data or UCI) decoding, whereas in aspect 1-1-a-2-3, such can be prevented.

When the specific sequence is DMRS type 1, the gNB may perform decoding of the 1-bit information and the data (UL data or UCI) by using aspects 1-1-a-2-1 and 1-1-a-2-2. When the specific sequence is not DMRS type 1, the gNB may perform decoding of the 1-bit information and the data (UL data or UCI) by using aspect 1-1-a-2-3.

The UE may transmit the 1-bit information by using PUCCH format 0.

For example, when the UE transmits 1-bit HARQ-ACKs by using PUCCH format 0, the interval between the CS indices corresponding to the 1-bit HARQ-ACKs "0" (NACK) and "1" (ACK) may be 6 (the interval between phase rotations may be π). For example, the CS indices corresponding to the respective 1-bit HARQ-ACKs "0" and "1" may be 0 and 6 (the phase rotations may be 0 and π).

When the UE multiplexes the 1-bit information (whether or not the beam change is performed) on the 1-bit HARQ-ACK, the UE may derive the CSs corresponding to the 1-bit HARQ-ACK and the 1-bit information, based on the CSs configured for the 1-bit HARQ-ACK (the CSs may be implicitly configured).

Figure 7:
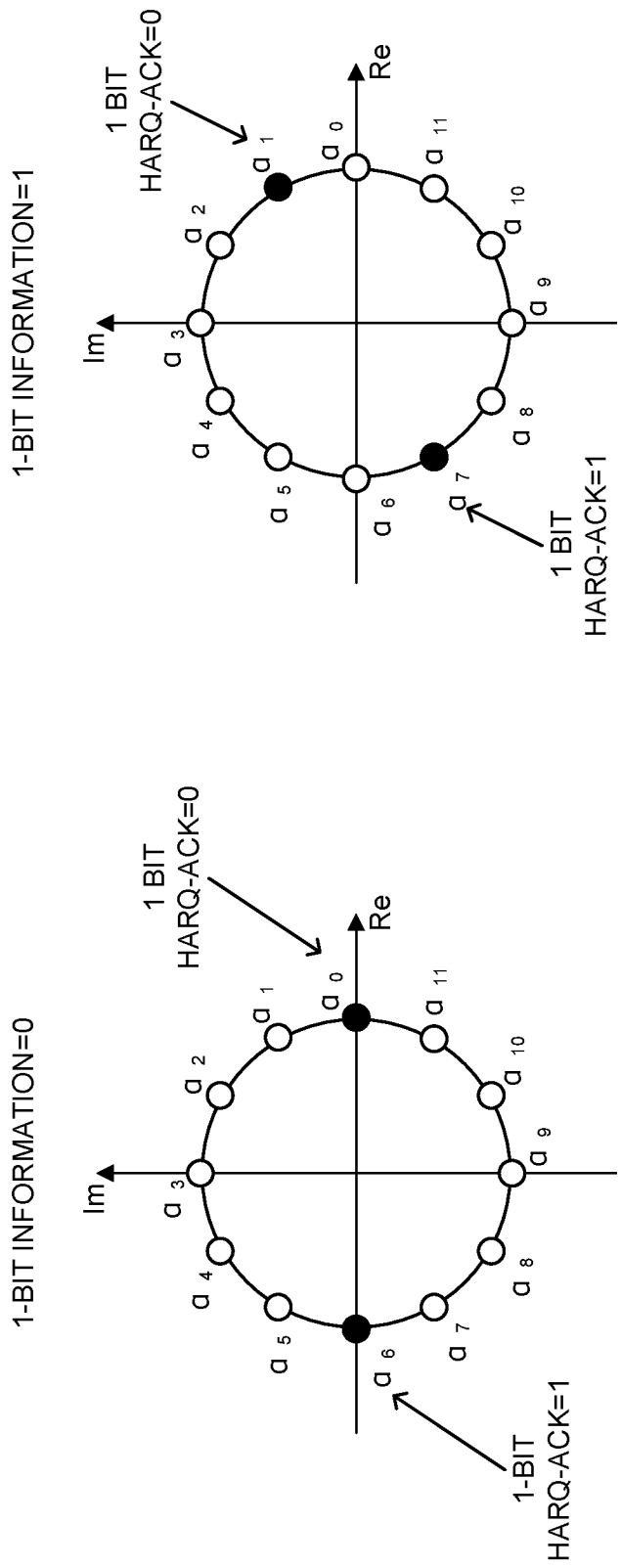
FIG. 7 is a diagram to show an example of CSs for multiplex of 1-bit HARQ-ACKs and 1-bit information.

When the UE multiplexes the 1-bit information (whether or not the beam change is performed) on the 1-bit HARQ-ACK, as shown in FIG. 7, the CS index corresponding to the 1-bit information "0" may be the same as the CS index corresponding to the 1-bit HARQ-ACKs "0" and "1". In this case, the CS index corresponding to the 1-bit information "0" and the 1-bit HARQ-ACK "0" may be 0, and the CS index corresponding to the 1-bit information "0" and the 1-bit HARQ-ACK "1" may be 6.

The CS index corresponding to the 1-bit information "1" may be the CS index obtained by adding a certain interval to the CS index corresponding to the 1-bit HARQ-ACKs "0" and "1". For example, the certain interval between the CS indices may be 1 (the interval between phase rotations may be π/6). In this case, the CS index corresponding to the 1-bit information "1" and the 1-bit HARQ-ACK "0" may be 1, and the CS index corresponding to the 1-bit information "1" and the 1-bit HARQ-ACK "1" may be 7.

{{{Aspect 1-1-a-2}}}}

For the UE, more than one value (for example, two values) of at least one parameter of the sequence index and the CS index is configured. For the UE, the parameter may be configured by using higher layer signaling.

The UE may select one of the more than one configured value in accordance with the 1-bit information to be transmitted, and transmit the specific sequence based on the selected value.

<<Aspect 1-1-b>>

The specific sequence may be a scrambling sequence for the UL data or the UCI, or may be an initial value for initializing a scrambling sequence generator. The initial value may be based on at least one of an RNTI (Radio Network Temporary Identifier), a higher layer parameter (for example, a data scrambling identifier for the PUSCH), and a cell identifier. The specific sequence may be a pseudo random sequence such as a Gold sequence.

The UE may determine the specific sequence in accordance with any one of the following aspects 1-1-b-1 and 1-1-b-2.

{{{{Aspect 1-1-b-1}}}}

For the UE, a parameter indicating at least one of the scrambling sequence or the initial value is configured. For the UE, the parameter may be configured by using higher layer signaling. The UE determines two sequences based on the parameter in accordance with a rule configured in advance (the UE derives the two sequences or the two sequences are implicitly configured for the UE). The UE may determine one sequence based on the parameter, and determine other sequences in accordance with the parameter and the rule.

The UE may select one of the two sequences as the specific sequence in accordance with the 1-bit information to be transmitted, and scramble the UL data or the UCI by using the specific sequence.

{{{{Aspect 1-1-b-2}}}}

For the UE, more than one value (for example, two values) of the parameter indicating at least one of the scrambling sequence or the initial value is configured. For the UE, the parameter may be configured by using higher layer signaling.

The UE may select one of the more than one configured value in accordance with the 1-bit information to be transmitted as the specific sequence, and scramble the UL data or the UCI by using the specific sequence.

The gNB may perform blind decoding by using two sequence replicas corresponding to the 1-bit information. The gNB may determine the 1-bit information corresponding to the replica that has been successfully subjected to blind decoding (determination of a CRC).

{{Aspect 1-2}}

The 1-bit information may be added to the UL data or the UCI on the UL channel (the PUSCH or the PUSCH).

The 1-bit information may be coded together with the UL data or the UCI (joint coding).

The 1-bit information may be coded separately from the UL data or the UCI (separate coding).

With the UE reporting 1 bit that indicates whether or not the beam change is necessary, overhead of the beam report can be reduced.

{{Aspect 1-3}}

UE operation after the report of the 1-bit information will be described.

The UE may assume that the UE receive beam for the PDCCH is the same as the UE receive beam corresponding to the latest reported beam measurement results. The UE may assume that the base station transmit beam for the PDCCH is the same as the base station transmit beam corresponding to the latest beam measurement results reported by the UE. In other words, the UE may assume that the TCI state for the PDCCH is the same as the TCI state corresponding to the latest reported beam measurement results (is in a QCL relationship with a signal/channel used for measurement corresponding to the latest reported beam measurement results).

It is assumed that certain time is necessary from when the beam measurement results (1-bit information) of the UE have been reported to when the base station switches the base station transmit beam.

If the UE reports beam change unnecessary ("0"), the UE may assume that the TCI state for at least one of the PDCCH, the PDSCH, and the PUCCH is not changed. If the UE reports at least one of beam change necessary ("1") and measurement results indicating a different best beam, the UE may assume the TCI state for at least one of the PDCCH, the PDSCH, and the PUCCH is not changed for certain time $T_{offset}$ from the report, and may assume that the TCI state for at least one of the PDCCH, the PDSCH, and the PUCCH is changed after $T_{offset}$ from the report.

$T_{offset}$ may be defined based on time required by the UE or the base station for switch of the beam (for example, the UE receive beam or the base station transmit beam).

Note that information related to $T_{offset}$ may be reported to the UE by using higher layer signaling, physical layer signaling, or a combination of these.

Figure 8:
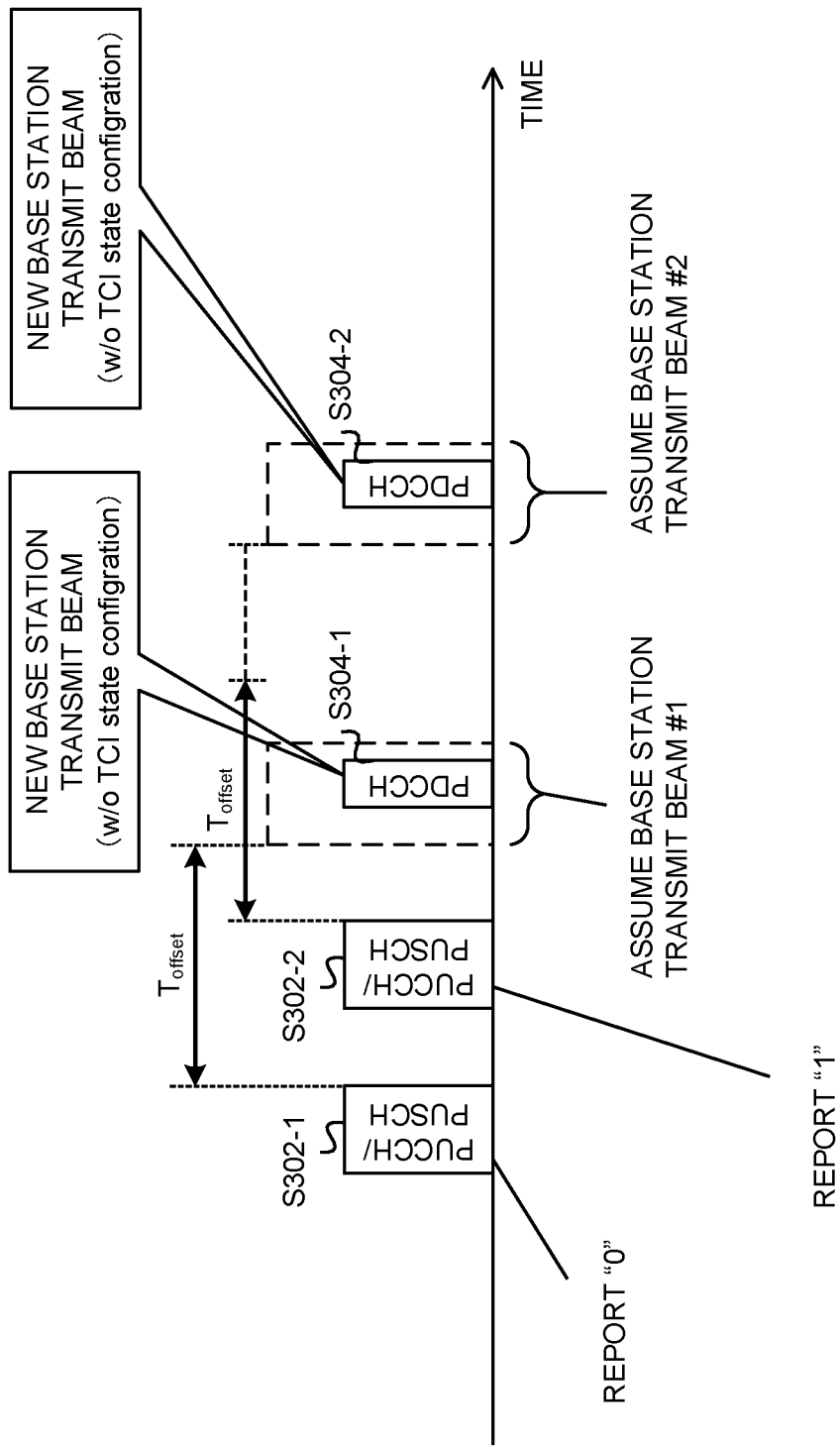
FIG. 8 is a diagram to show an example of assumption of a base station transmit beam of a PDCCH based on $T_{offset}$.

FIG. 8 is a diagram to show an example of assumption of the base station transmit beam of the PDCCH based on $T_{offset}$. In Step S302 (Steps S302-1 and S302-2), the UE measures RSs #1 to #4 to which transmit beam sweeping of the base station is applied by using the same UE receive beam, and transmits a measurement report (for example, CSI) based on its measurement results by using the PUCCH or the PUSCH. S302-1 assumes base station transmit beam #1, S302-1 is a report ("0") indicating that the beam change is unnecessary, and S302-2 is at least one of a report ("1") indicating that the beam change is necessary and measurement results indicating a different best beam.

The base station may determine performance of switch of the TCI state for the PDCCH of the UE, based on the report from the UE.

In Step S304 (Steps S304-1 and S304-2), the base station may transmit the PDCCH transmitted in any CORESET after the switch of the TCI state for the PDCCH, by using a new base station transmit beam (TCI state). The UE assumes that base station transmit beam #1 is applied to the PDCCH in S304-1, and the UE assumes that base station transmit beam #2 is applied to the PDCCH in S304-2.

The assumption of the time point of Step S304-1 is made because the report of Step S302-1 is the latest report transmitted at time in or earlier than $T_{offset}$ whereas the report of Step S302-2 is transmitted at time within $T_{offset}$.

The assumption of the time point in Step S304-2 is made because the report of Step S302-2 is the latest report transmitted in or earlier than $T_{offset}$.

Note that, in duration of a certain CORESET, the assumption of the UE related to the receive beam for the PDCCH may change.

Figure 9:
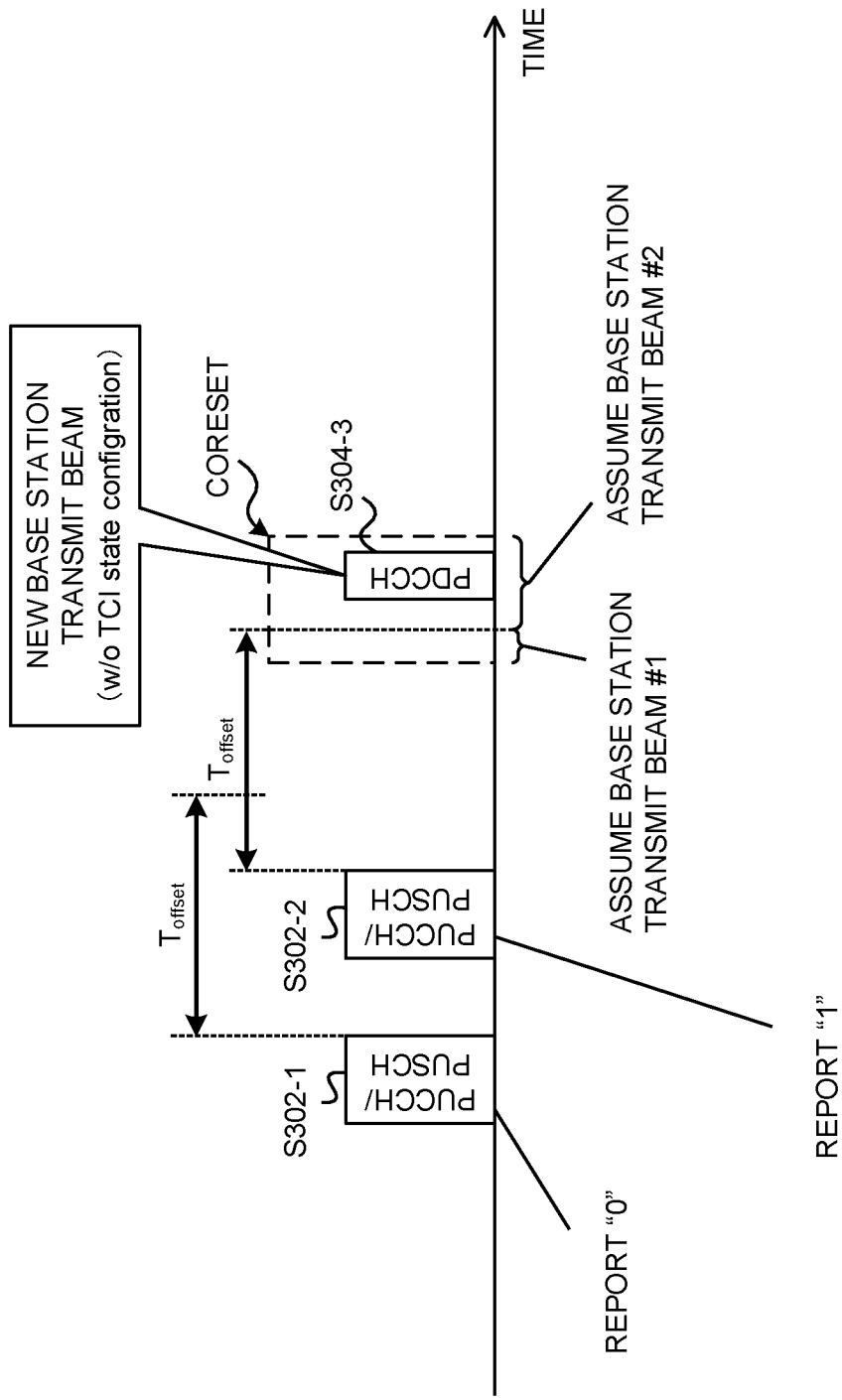
FIG. 9 is a diagram to show another example of assumption of a base station transmit beam of a PDCCH based on $T_{offset}$.

FIG. 9 is a diagram to show another example of assumption of the base station transmit beam of the PDCCH based on $T_{offset}$. The present example shows Step S304-3 with a different temporal position of the CORESET from FIG. 8.

The present example is different from Step S304 described above in that the UE assumes that base station transmit beam #1 is applied to the PDCCH up to the middle of the CORESET of Step S304-3 and the UE assumes that base station transmit beam #2 is applied to the PDCCH thereafter.

Figure 10:
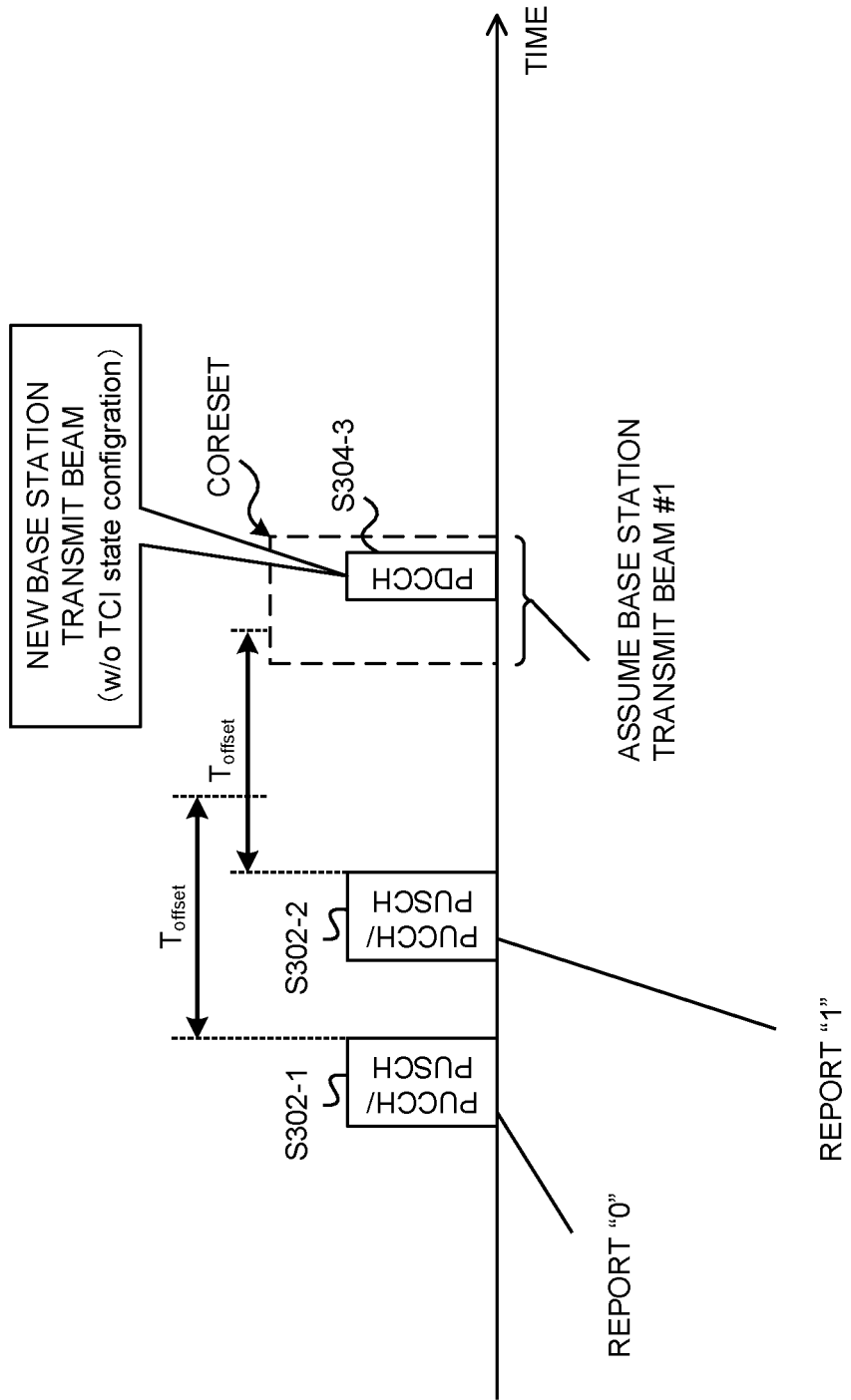
FIG. 10 is a diagram to show still another example of assumption of a base station transmit beam of a PDCCH based on $T_{offset}$.

The assumption of the time point in the middle of the CORESET is made because the report of Step S302-1 is the latest report transmitted at time in or earlier than $T_{offset}$ whereas the report of Step S302-2 is transmitted at time within $T_{offset}$ The assumption after the time point in the middle of the CORESET is made because the report of Step S302-2 is the latest report transmitted at time in or earlier than $T_{offset}$ FIG. 10 is a diagram to show still another example of assumption of the base station transmit beam of the PDCCH based on $T_{offset}$. The present example shows an example similar to FIG. 9.

FIG. 10 is different from FIG. 9 in that the UE does not change the assumption of the base station transmit beam in the CORESET of Step S304-3 in the middle. The UE may assume that the base station transmit beam applied to the PDCCH in the CORESET is base station transmit beam #1 corresponding to the report of Step S302-1 being the latest report transmitted in or earlier than $T_{offset}$ from the time point of the start position (for example, a start symbol, a start slot, or the like) of the CORESET.

In this manner, the UE may assume that the base station transmit beam/UE receive beam of the CORESET (the PDCCH included therein) starting in or after $T_{offset}$ from the report of the beam measurement results is the same as the assumption of the base station transmit beam/UE receive beam at the time point of the report of the beam measurement results. In this case, switch of the base station transmit beam or the UE receive beam does not occur in the CORESET, and thus time of switch of the transmit and receive beam (time in which transmission and reception cannot be performed) can be prevented from being generated in the CORESET.

The UE may assume that the base station transmit beam of the PDSCH at time T is the same as the base station transmit beam of the (latest) PDCCH at time that is $T_{offset2}$ or earlier than the time T.

The UE may assume that the UE receive beam of the PDSCH at the time T is the same as the UE receive beam of the (latest) PDCCH at time that is $T_{offset2}$ or more earlier than the time T.

The UE may assume that the base station receive beam of the PUCCH at the time T is the same as at least one of the base station transmit beam of the (latest) PDSCH and the base station transmit beam of the (latest) PDCCH at time that is $T_{offset3}$ or earlier than the time T.

The UE may assume that the UE transmit beam of the PUCCH at the time T is the same as at least one of UE receive beam of the (latest) PDSCH and the UE receive beam of the (latest) PDCCH at time that is $T_{offset3}$ or earlier than the time T.

$T_{offset2}$, $T_{offset3}$, and the like may be defined based on time required by the UE or the base station for switch of the beam (for example, the UE transmit beam or the base station receive beam). Note that information related to $T_{offset2}$, $T_{offset3}$, and the like may be reported to the UE by using higher layer signaling, physical layer signaling, or a combination of these.

According to aspect 1-3 described above, the UE can recognize timing of the beam change appropriately.

According to aspect 1 described in the above, with the UE multiplexing information that beam change is unnecessary on the UL channel and transmitting the information, overhead of the beam report can be reduced.

<Aspect 2>

In aspect 2, the UE reports a beam report including information of at least one of whether or not the beam change is necessary and an index (ID) of the best beam.

The UE may transmit the beam report in accordance with any one of the following aspects 2-1, 2-2, and 2-3.

{{Aspect 2-1}}

The UE may transmit multiple-bit (m-bit) information (beam report) by using sequence selection in the UL channel (for example, any one of the PUCCH, the PUSCH, and the SRS).

The UE may transmit the m-bit information by using a sequence (specific sequence) of any one of the following aspects 2-1-a and 2-1-b.

<<Aspect 2-1-a>>

The specific sequence may be based on at least one of a sequence index and a cyclic shift (CS) index. The specific sequence may be a sequence used for at least one of PUCCH formats 0, 1, 3, and 4 of NR, or may be a DMRS sequence used for the PUCCH or the PUSCH. The specific sequence may be a CAZAC (Constant Amplitude Zero Auto Correlation) sequence or a low PAPR (Peak-to-Average Power Ratio) sequence. The specific sequence may be defined by a cyclic shift (which is indicated by the CS index) of a base sequence (which is indicated by the sequence index).

The UE may determine the specific sequence in accordance with any one of the following aspects 2-1-a-1 and 2-1-a-2.

{{{{Aspect 2-1-a-1}}}}

For the UE, at least one parameter of the sequence index and the CS index is configured. For the UE, the parameter may be configured by using higher layer signaling. The UE determines $2^m$ sequences based on the parameter in accordance with a rule configured in advance (the UE derives the $2^m$ sequences or the $2^m$ sequences are implicitly configured for the UE). The UE may determine one sequence based on the parameter, and determine other $2^m-1$ sequences in accordance with the parameter and the rule.

The UE may determine one of the $2^m$ sequences as the specific sequence in accordance with the m-bit information to be transmitted.

The UE may derive each of the CS indices $0, 1, \ldots, 2^m-1$ for the $2^m$ values of the m-bit information, based on the configured parameter. When 0 is configured as the CS index, the UE may derive CS indices $1, \ldots, 2^m-1$.

The UE may derive 2m combinations of the sequence indices and the CS indices (combinations of $2^{m-1}$ values of the sequence index and $2^{m-1}$ values of the CS index) for the $2^m$ values of the m-bit information, based on the configured parameter. The $2^{m-1}$ values of the sequence derivation parameter to be added to the initial sequence index for derivation of the sequence index and the $2^{m-1}$ values of the CS derivation parameter to be added to the initial CS index for derivation of the CS index may be configured in advance.

For example, when m is 4, the UE selects one specific sequence out of 16 sequences. It is assumed that, for the UE, 3 is configured as the initial sequence index and 0 is configured as the initial CS index.

The UE may determine four sequence indices, based on addition of the initial sequence index and each of certain four values of the sequence derivation parameter. The interval between the four values of the sequence derivation parameter may be configured in advance. For example, when the four values of the sequence derivation parameter are 0, 1, 2, and 3 (when the interval between the four values is 1), the UE determines 3, 4, 5, and 6 as the four sequence indices, based on the initial sequence index.

The UE may determine four CS indices, based on addition of the initial CS index and each of certain four values of the CS derivation parameter (for example, $m_{CS}$). The interval between the four values of the CS derivation parameter may be configured in advance. For example, when the four values of the CS derivation parameter are 0, 3, 6, and 9 (when the interval between the four values is 3), the UE determines 0, 3, 6, and 9 as the four CS indices, based on the initial CS index.

For the UE, at least one parameter of a sequence index, a CS index, a PRB index, a PRG index, and a symbol index may be configured. The UE may derive 2m combinations of any of the sequence index, the CS index, the PRB index, the PRG index, and the symbol index, based on the configured parameter.

The UE may use a DMRS of DMRS type 1 (having a comb-like structure) for the PUSCH as the specific sequence.

The UE may transmit the specific sequence in at least any one of a symbol of the DMRS and a symbol of the UCI. The UE may use the DMRS for PUCCH format 1 as the specific sequence, or may use a sequence to be multiplied to the UCI as the specific sequence.

When the resource of the UL channel (the PUSCH or the PUCCH) includes DMRS symbols and data (UCI or UL data) symbols, the UE may transmit the m-bit information in accordance with one of the following transmission methods 1 and 2.

[Transmission Method 1]

When the UE transmits the m-bit information in the DMRS symbol, the UE transmits the m-bit information by using the specific sequence (sequence selection). When the UE transmits the m-bit information in the data symbol, the UE does not transmit the m-bit information by using the specific sequence (sequence selection).

[Transmission Method 2]

When the UE transmits the m-bit information in the DMRS symbol, the UE does not transmit the m-bit information by using the specific sequence (sequence selection). When the UE transmits the m-bit information in the data symbol, the UE transmits the m-bit information by using the specific sequence (sequence selection).

{{{{Aspect 2-1-a-2}}}}

For the UE, $2^m$ values of at least one parameter of the sequence index and the CS index are configured. For the UE, the parameter may be configured by using higher layer signaling.

The UE may select one of the $2^m$ values in accordance with the m-bit information to be transmitted, and transmit the specific sequence based on the selected value.

<<Aspect 2-1-b>>

The specific sequence may be a scrambling sequence for the UL data or the UCI, or may be an initial value for initializing a scrambling sequence generator. The initial value may be based on at least one of an RNTI (Radio Network Temporary Identifier), a higher layer parameter (for example, a data scrambling identifier for the PUSCH), and a cell identifier. The specific sequence may be a pseudo random sequence such as a Gold sequence.

The UE may determine the specific sequence in accordance with any one of the following aspects 2-1-b-1 and 2-1-b-2.

{{{{Aspect 2-1-b-1}}}}

For the UE, a parameter indicating at least one of the scrambling sequence or the initial value is configured. For the UE, the parameter may be configured by using higher layer signaling. The UE determines $2^m$ sequences based on the parameter in accordance with a rule configured in advance (the UE derives the $2^m$ sequences or the $2^m$ sequences are implicitly configured for the UE). The UE may determine one sequence based on the parameter, and determine other $2^m-1$ sequences in accordance with the parameter and the rule.

The UE may select one of the $2^m$ sequences as the specific sequence in accordance with the m-bit information to be transmitted, and scramble the UL data or the UCI by using the specific sequence.

{{{{Aspect 2-1-b-2}}}}

For the UE, $2^m$ values of the parameter indicating at least one of the scrambling sequence or the initial value are configured. For the UE, the parameter may be configured by using higher layer signaling.

The UE may select one of the $2^m$ values as the specific sequence in accordance with the m-bit information to be transmitted, and scramble the UL data or the UCI by using the specific sequence.

{{Aspect 2-2}}

The UE may report a beam report including an index of the beam (RS) having the best measurement results, the best measurement results, an index of the beam (RS) having the second best measurement results, and a differential value between the best measurement results and the second best measurement results.

The size of the differential value may be smaller than the size of the best measurement results. For example, the best measurement results may be 7 bits, and the differential value may be 4 bits. In this manner, overhead of the beam report can be reduced.

{{Aspect 2-3}}

For the UE, a plurality of resources corresponding to a plurality of beams (RSs) may be configured for the UL channel (for example, any one of the PUCCH, the PUSCH, and the SRS). The UE may transmit measurement results of the best beam by using a resource corresponding to the best beam out of the plurality of resources.

The measurement results of the best beam may be at least one of a maximum value of the L1-RSRP, a maximum value of the L1-RSRQ, a maximum value of the L1-SINR, a maximum value of the channel quality, and a minimum value of the interference.

Figure 11A:
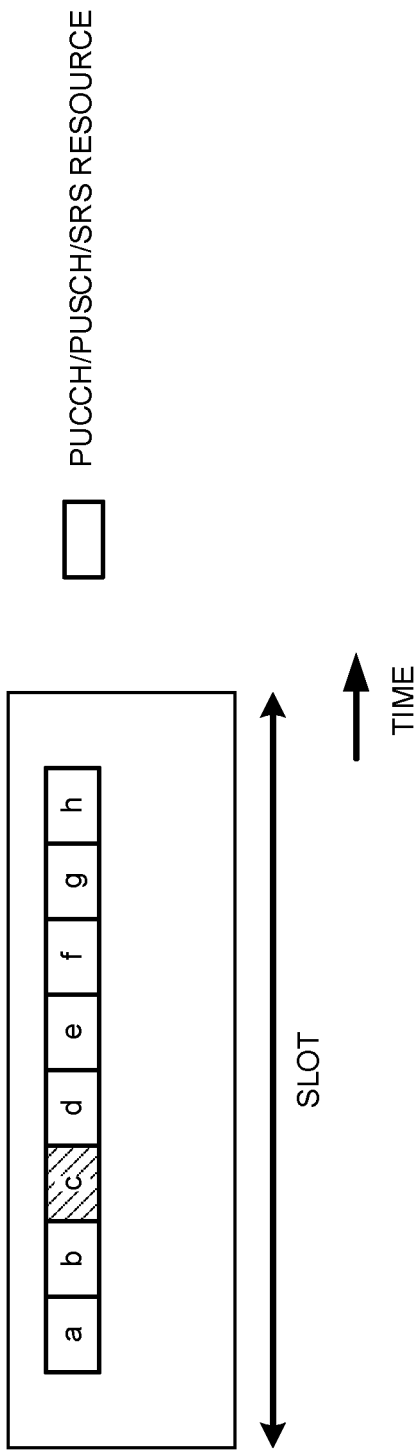
FIG. 11A and FIG. 11B are each a diagram to show an example of resources for a report of beam measurement results of the best beam.

As shown in FIG. 11A, for the UE, eight time resources a to h (for example, symbols) respectively associated with eight beam (RS) indices may be configured for the UL channel. The UE may transmit the PUCCH or the PUSCH by using the time resource corresponding to the best beam.

Figure 11B:
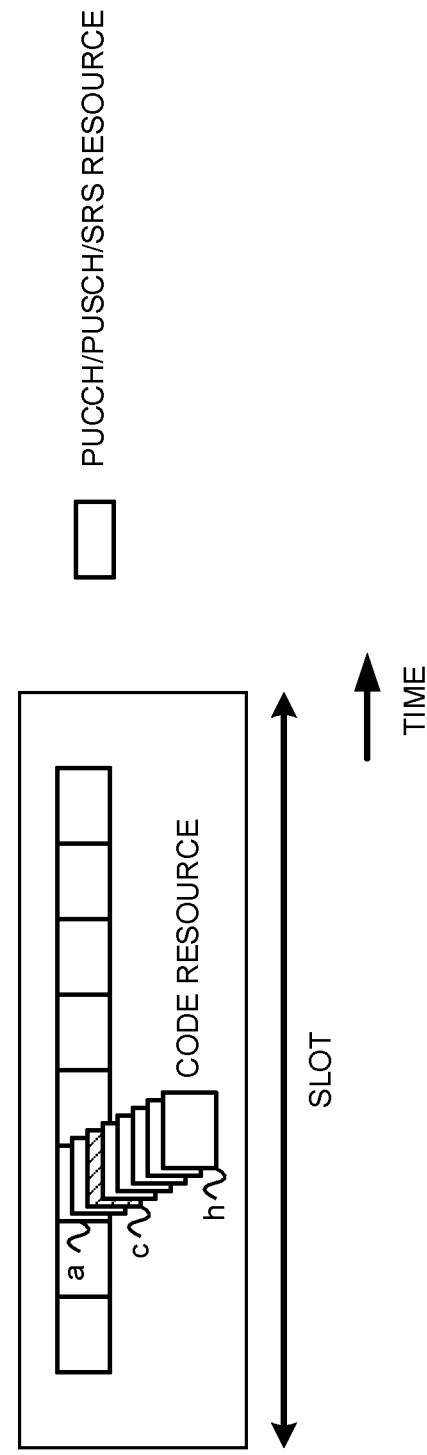

As shown in FIG. 11B, for the UE, eight code resources a to h (for example, at least one of the sequence index and the CS index) respectively associated with eight beam (RS) indices may be configured for the DMRS of the UL channel. The UE may transmit the DMRS by using the code resource corresponding to the best beam.

{{Aspect 2-4}}

When the UE determines the beam change unnecessary, the UE may transmit a beam report by using a resource (specific resource) configured from the gNB.

When the best beam that the UE attempts to report is the same as the beam used for at least one of the PDCCH, the PDSCH, and the PUCCH or a previously reported best beam, the UE may determine the beam change unnecessary.

The specific resource may be a resource based on the initial sequence index and the initial CS index, may be a sequence index based on the initial sequence index and value 0 of the sequence derivation parameter, or may be a CS index based on the initial CS index and value 0 of the CS derivation parameter.

When the UE determines the beam change unnecessary, the gNB need not perform decoding of sequence selection, and can perform channel estimation by assuming the DMRS using the specific resource. Consequently, reception operation of the gNB can be simplified.

In the example of aspect 2-1-a-1, the specific resource may be a specific sequence that can be obtained by the sequence index based on the initial sequence index and value 0 of the sequence derivation parameter and the CS index based on the initial CS index and value 0 of the CS derivation parameter.

In the example of aspect 2-3, resources a, b, . . . , h are respectively configured for the UE for beams #0, #1, . . . , #7, and the specific resource may be a.

The UE may associate the specific resource with a beam in use, and associate the rest of the resources with other beams. When the UE determines that the beam change is unnecessary, the UE may transmit measurement results by using specific resource a. When the UE determines that the beam change is necessary in a state in which beam #2 is in use, the UE may transmit measurement results by using the resource associated with the best beam.

For example, the UE may associate specific resource a with beam #2, and respectively associate the rest of resources b, c, d, . . . , h with beams #0, #1, #3, . . . , #7 except for beam #2. For example, the UE may associate specific resource a with beam #2, and respectively associate the rest of resources b, c, d, . . . , h with beams #3, #4, . . . , #7, #0, #1 in sequential order.

According to aspect 2 described above, with the UE multiplexing information of at least one of whether or not the beam change is necessary and the index of the best beam on the UL channel, overhead of the beam report can be reduced.

<Aspect 3>

The UE may determine which of the 1-bit information and the multiple-bit information is to be multiplexed on the DMRS, according to the transmission bandwidth of the DMRS (DMRS sequence length).

When the DMRS sequence length is equal to or less than L, the 1-bit information is multiplexed on the DMRS. L may be 12, 24, 36, or the like. CS parameter values that are respectively associated with the pieces of 1-bit information 0 and 1 may be 0 and 1 or may be 0 and 6.

When the DMRS sequence length is larger than L, the multiple-bit information is multiplexed on the DMRS. The CS parameter values that are respectively associated with the pieces of m-bit information $0, 1, \ldots, 2^m-1$ may be $0, 1, \ldots, 2^m-1$. The UE may determine the interval between the CS parameter values according to m and a DMRS sequence length M. The interval between the CS parameter values may be M/m. When M is 12 and m is 2, the CS parameter values that are respectively associated with the pieces of m-bit information 0, 1, 2, and 3 may be 0, 3, 6, and 9.

The UE may determine the DMRS sequence length, based on the bandwidth allocated to the PUSCH. For example, when DMRS type 1 is configured for the UE and four PRBs are configured for the UE as a PUSCH allocation bandwidth, six REs are used for the DMRS per PRB (12 REs), and thus the DMRS sequence length is 24 (=4×6).

As the DMRS sequence length is increased larger (the allocation bandwidth of the DMRS is more extended), orthogonality between neighboring CSs may collapse under the influence of frequency selectivity. When the UE determines the number of bits to be multiplexed based on the DMRS sequence length, characteristics can be improved.

<Aspect 4>

Information to be multiplexed on the DMRS sequence is not limited to the UL TCI state and the UL beam-related information (at least one of the information indicating whether or not the beam change is necessary and the best beam index).

The UE may multiplex the information related to at least one of the beam management and the CSI on the DMRS sequence. The information may be at least one of information indicating whether or not change of CSI parameters is necessary and the best CSI (for example, the RI, the PMI, the LI, the CQI, or the like).

The UE may multiplex information reported by the UE on the DMRS sequence. The information may be at least one of the ACK/NACK and information (for example, an index) indicating the UL beam.

According to aspect 4 described above, overhead of the beam report and other reports can be reduced.

<Aspect 5>

Even when transmission of the beam report is configured, the UE skips the transmission of the beam report (does not perform the transmission) if a specific condition is satisfied.

The UE may skip the transmission of the beam report in accordance with any one of the following aspects 5-1 and 5-2.

{{Aspect 5-1}} Even when transmission of the P (P-CSI)/SP (SP-CSI) beam report is configured, the UE skips the transmission of the beam report if the UE reports that the beam change is unnecessary (that the best beam is not changed, or the 1-bit information "0").

When the UE reports the beam change unnecessary, the UE may perform a certain number y of times of skip of the transmission of the beam report after the elapse of a certain time offset $T_{offset}$ from the report. The certain time offset may be referred to as a time offset from the DCI reception to the transmission skip start of the beam report. The certain number of times may be referred to as the number of times of skip.

At least one of the time offset and the number of times of skip may be configured by using higher layer signaling, or may be defined in a specification. For example, when the UE reports the beam change unnecessary, the UE may perform the transmission skip of the beam report by taking the configured time offset and the number of times of skip into consideration.

Note that the length of the time offset may be represented in, for example, the number of specific time units (symbols, slots, subframes, or the like), a second unit, a subdivided unit of a second (for example, microsecond), or the like. The length of the time offset may be defined in a specification for each subcarrier spacing or numerology. When the length of the time offset is defined in a specification, the time offset need not be reported to the UE.

Figure 12:
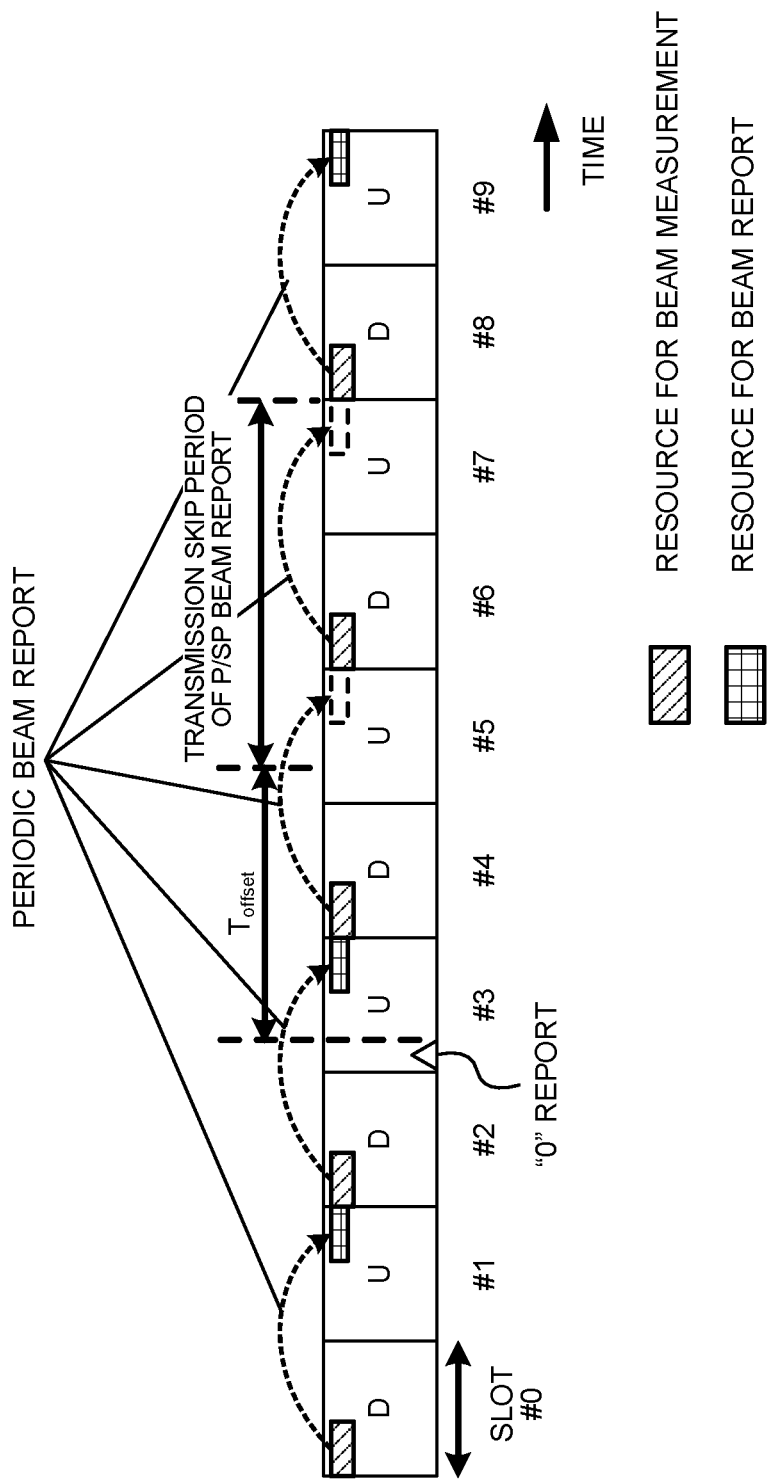
FIG. 12 is a diagram to show an example of skip of transmission of a beam report.

FIG. 12 is a diagram to show an example of skip of transmission of a beam report based on a UE report. In the present example, the UE is configured to perform beam measurement in the resources for beam measurement of even-numbered slots and transmit pieces of CSI corresponding to results of the measurement in respective odd-numbered slots (that is, periodically at intervals of two slots).

In the present example, two slots are configured as the time offset ($T_{offset}$), and two times is configured as the number of times of skip. When the UE reports the beam change unnecessary in slot #3, the UE performs two times of transmission skip of the beam reports (beam reports of slots #5 and #7) that occur at or after certain timing after the elapse of two slots after the report timing, that is, at or after slot #5.

As can be seen from FIG. 12, a period from the time point after the elapse of $T_{offset}$ from the report of the beam change unnecessary to occurrence (elapse) of the number of times of skip of the timings (slots) of the resource for the P/SP report (in FIG. 12, from the middle of slot #5 to the end of slot #7) may be referred to as a transmission skip period of the P/SP beam report.

The UE may skip beam measurement using the P/SP measurement resource in the period. The UE may skip the beam measurement in which a corresponding beam report is to be transmitted in the period. In these cases, when transmission skip of the P/SP beam report is indicated, the P/SP measurement can also be omitted, and thus power consumption of the UE can be reduced.

The UE may assume that the base station does not transmit a signal for beam measurement in the transmission skip period of the P/SP beam report.

The length of the transmission skip period may be reported to the UE by using higher layer signaling or physical layer signaling. The length may be represented in, for example, the number of specific time units (symbols, slots, subframes, or the like), a second unit, a subdivided unit of a second (for example, microsecond), or the like. The specific time unit may be defined in a specification for each subcarrier spacing or numerology. When the length of the transmission skip period is reported or defined in a specification, the number of times of skip need not be reported to the UE. Note that the transmission skip period may be defined in a manner of including the time offset as well.

After the configured number of times of skip is completed and before the beam change unnecessary is reported again, the UE may transmit the P/SP beam report (report of slot #9 may be transmitted).

Note that, when the UE reports the beam change unnecessary, the UE may start a timer for transmission skip in a MAC layer or a physical layer, for example. The timer may be a timer for measuring the length of the transmission skip period, and the UE may perform control of skipping the transmission of the beam report while the timer runs. When the timer expires, the UE may perform control of not skipping the transmission of the beam report.

{{Aspect 5-2}}

Note that, when transmission of the P/SP beam report is configured and the UE reports the beam change unnecessary, the UE may skip transmission of the aperiodic (A-CSI) beam report as well or may assume that transmission of the aperiodic beam report is not skipped.

Figure 13:
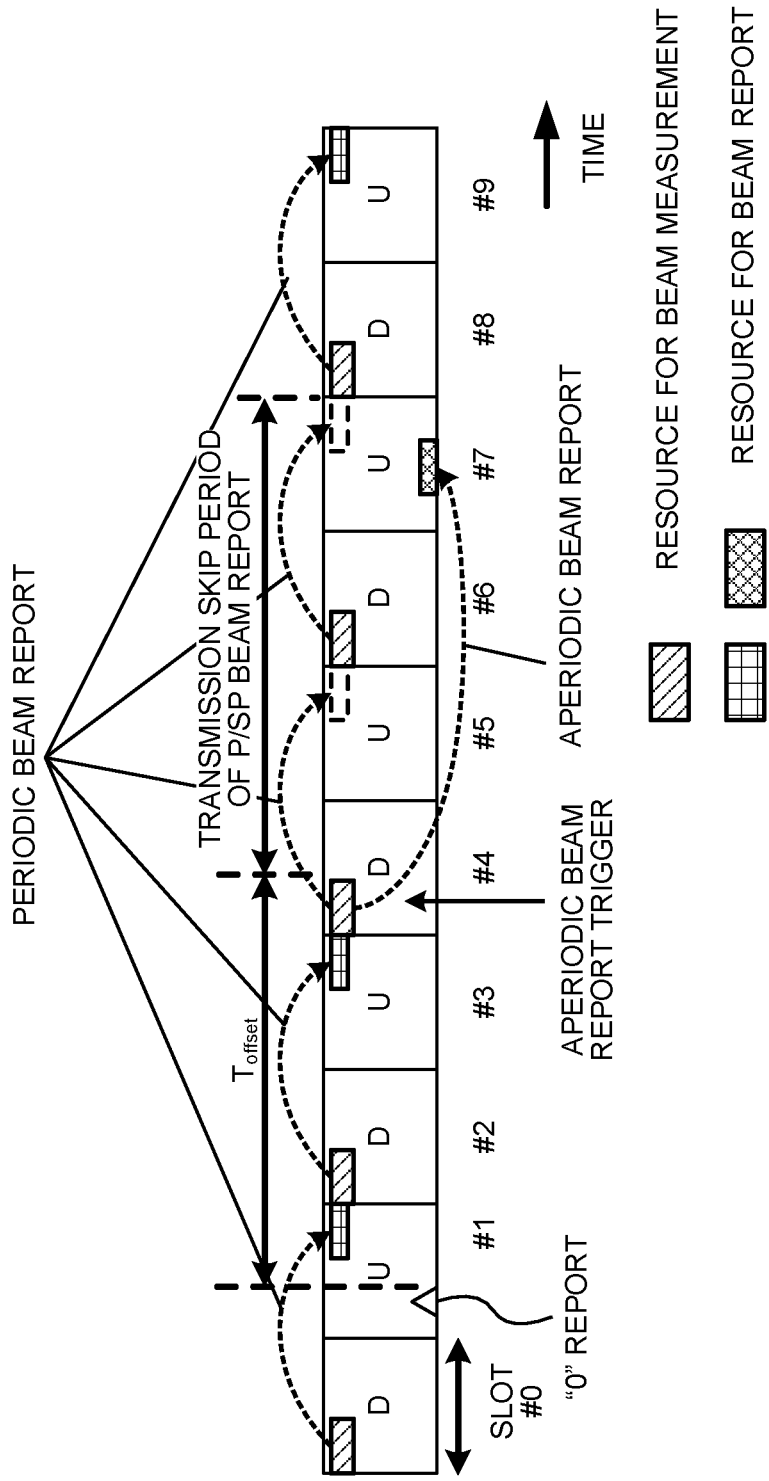
FIG. 13 is a diagram to show an example of skip of transmission of an aperiodic beam report.

FIG. 13 is a diagram to show an example of skip of transmission of the aperiodic beam report. The present example is similar to FIG. 12, but is different in that transmission of the aperiodic beam report is triggered for the UE in slot #4 and a report resource corresponding to the trigger is included in slot #7.

The UE may perform the transmission of the aperiodic beam report even in the transmission skip period of the P/SP beam report. According to the configuration described above, the base station can be caused to perform trigger of the aperiodic beam report while causing the base station to reserve resources for the P/SP beam report of the UE.

The UE may skip the transmission of the aperiodic beam report (may not necessarily perform the transmission) in the transmission skip period of the P/SP beam report. In this case, in the transmission skip period of the P/SP beam report, transmission of any beam report may be skipped. In the transmission skip period, the UE may not necessarily perform the beam measurement, or may turn off the antenna port for the beam report. According to the configuration described above, power consumption of the UE can be reduced. Note that the UE may assume that transmission of the aperiodic beam report is not triggered in the transmission skip period.

Note that the base station may perform scheduling that takes into consideration resources for the report of the periodic/semi-persistent/aperiodic beam report of which a certain UE skips transmission (which may be referred to as skip resources). According to the control, use efficiency of the resources can be enhanced appropriately.

For example, in the skip resources of the certain UE, the base station may perform control of enhancing a coding rate of UL transmission of the UE (for example, transmission of other UCI different from the beam measurement results). The base station may perform control of changing the skip resources of the certain UE into DL symbols or of performing DL reception (for example, PDSCH reception) in the skip resources. The UE may perform transmission and reception processing by assuming that the base station performs the control as described above.

According to aspect 5 described above, power consumption of the UE used for P/SP transmission can be reduced appropriately. In addition, by skipping the aperiodic beam report as well, power consumption of the UE can be further reduced. In the resource for the beam measurement report (resource for the CSI report) in which the beam report transmission is skipped, the UE can perform transmission of the UCI other than the beam measurement results with a higher coding rate than when the beam report transmission is not skipped.

<Aspect 6>

In the following, information included in the beam report according to the present disclosure will be described.

When the UE reports at least one of the L1-RSRP, the L1-RSRQ, the L1-SINR, and the results of the channel quality measurement, the UE may report a certain number of the largest values (a certain number of values in descending order from the largest value). When the UE reports at least one of the results of the interference measurement, the UE may report a certain number of the smallest values (a certain number of values in ascending order from the smallest value). Note that, when a plurality of values are included in the UCI, one value and a difference between the one value and another value may be included.

Information related to the certain number may be reported to the UE by using higher layer signaling, physical layer signaling, or a combination of these. The certain number may be, for example, 1, 2, 4, or the like. Regarding the certain number, different values may be configured for the report of the channel quality measurement and the report of the interference measurement.

The UE may report a beam index, a resource ID for beam measurement (for example, an SSBRI or a CRI), or an index of a signal for beam measurement (for example, an SSB index or a CSI-RS ID) that corresponds to at least one of a certain number of the largest L1-RSRPs, L1-RSRQs, L1-SINRs, and results of the channel quality measurement.

The UE may report a beam index, a resource ID for beam measurement (for example, an SSBRI or a CRI), or an index of a signal for beam measurement (for example, an SSB index or a CSI-RS ID) that corresponds to at least one of a certain number of the smallest results of the interference measurement.

The resource of the PUCCH or the PUSCH may correspond to the beam index, the resource ID for beam measurement, or the index of a signal for beam measurement. Without the UE explicitly reporting information related to the beam index and the like but with the report being performed by using a specific PUCCH/PUSCH resource, the UE may implicitly report the beam index and the like to the base station.

For example, for the UE, X (for example, eight) PUCCH/PUSCH resources corresponding to the beams/resources/IDs for beam measurement may be configured by using higher layer signaling. The UE may transmit the CSI report by using x (for example, two) resources corresponding to report target beams/resources/IDs out of the X resources.

Note that the PUCCH/PUSCH resource configured for the CSI report may correspond to at least one of a time resource, a frequency resource, a code resource (for example, a cyclic shift and an orthogonal cover code (OCC)), and the like.

Figure 14:
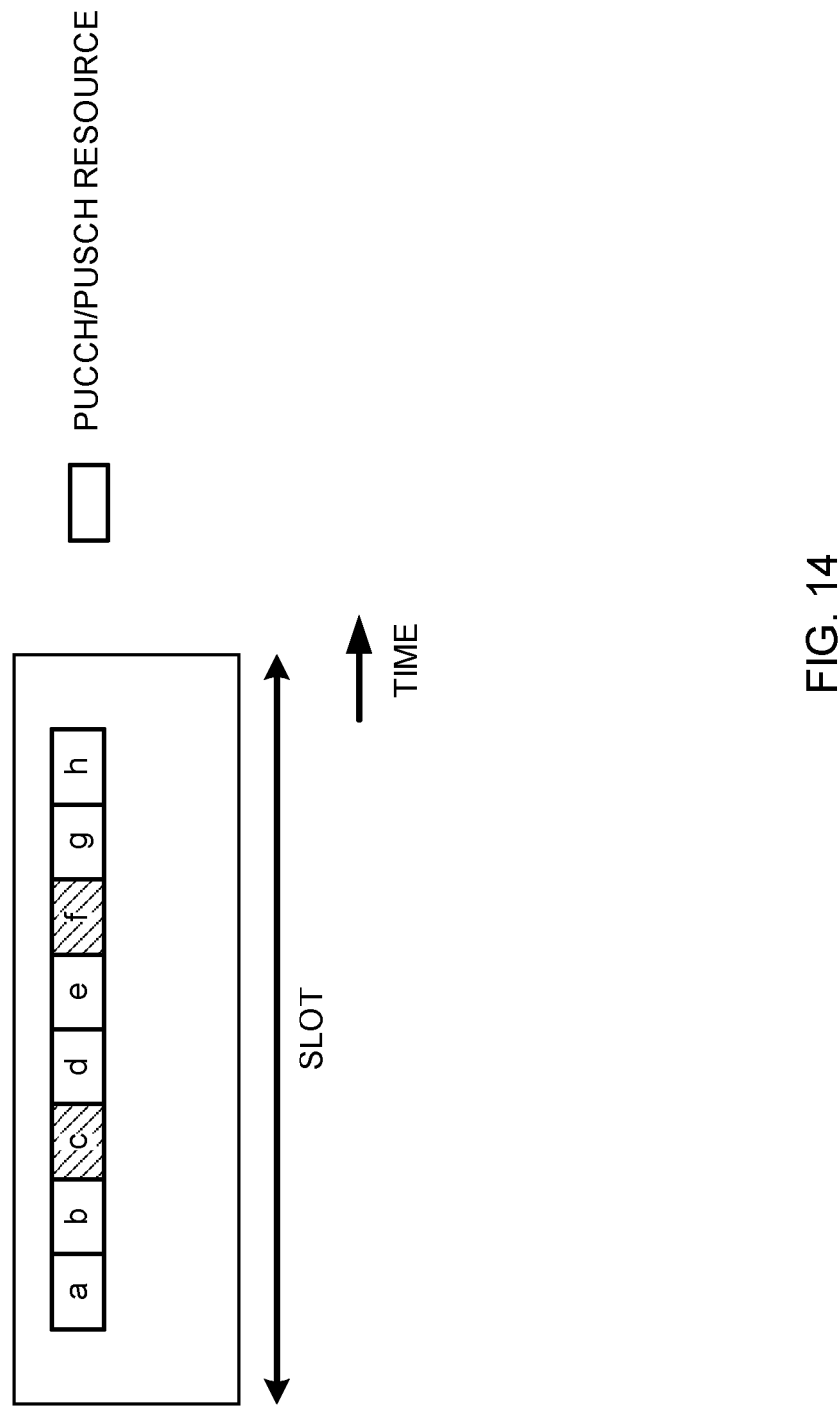
FIG. 14 is a diagram to show an example of resources for a report of beam measurement results.

FIG. 14 is a diagram to show an example of the PUCCH or PUSCH resources for the report of the beam measurement results. In the present example, for the UE, eight PUCCH/PUSCH resources are configured for the report, corresponding to the resources for beam measurement. For example, the resources may be resources for a scheduling request (SR) for PUCCH format 0.

The configured resources correspond to respective beams a to h. In FIG. 14, in order to report the results of the beams c and f, the UE performs transmission in SR resources corresponding to these.

Note that the "certain number of the largest values" described above may be interpreted as "values whose measurement results are equal to or higher than a threshold," a "certain number of the largest values whose measurement results are equal to or higher than a threshold," or the like. The "certain number of the smallest values" described above may be interpreted as "values whose measurement results are less than a threshold," a "certain number of the smallest values whose measurement results are less than a threshold," or the like. The threshold herein may be configured by using higher layer signaling, or may be determined in a specification.

The threshold for the measurement results may be configured for the UE by using higher layer signaling, or may be defined in a specification. The UE may select a beam having the best second measurement results out of the beams whose first measurement results satisfy a condition of the threshold and report the beam. The UE may select X beams in descending order from the beam having the largest second measurement results out of the beams whose first measurement results satisfy a condition of the threshold and report the X beams. For example, the UE may select X beams in descending order from the beam having the largest L1-RSRP out of the beams whose interference is lower than the threshold.

When the UE reports more than one measurement result to the base station, how the base station determines the beam for the UE may depend upon implementation of the base station.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 15:
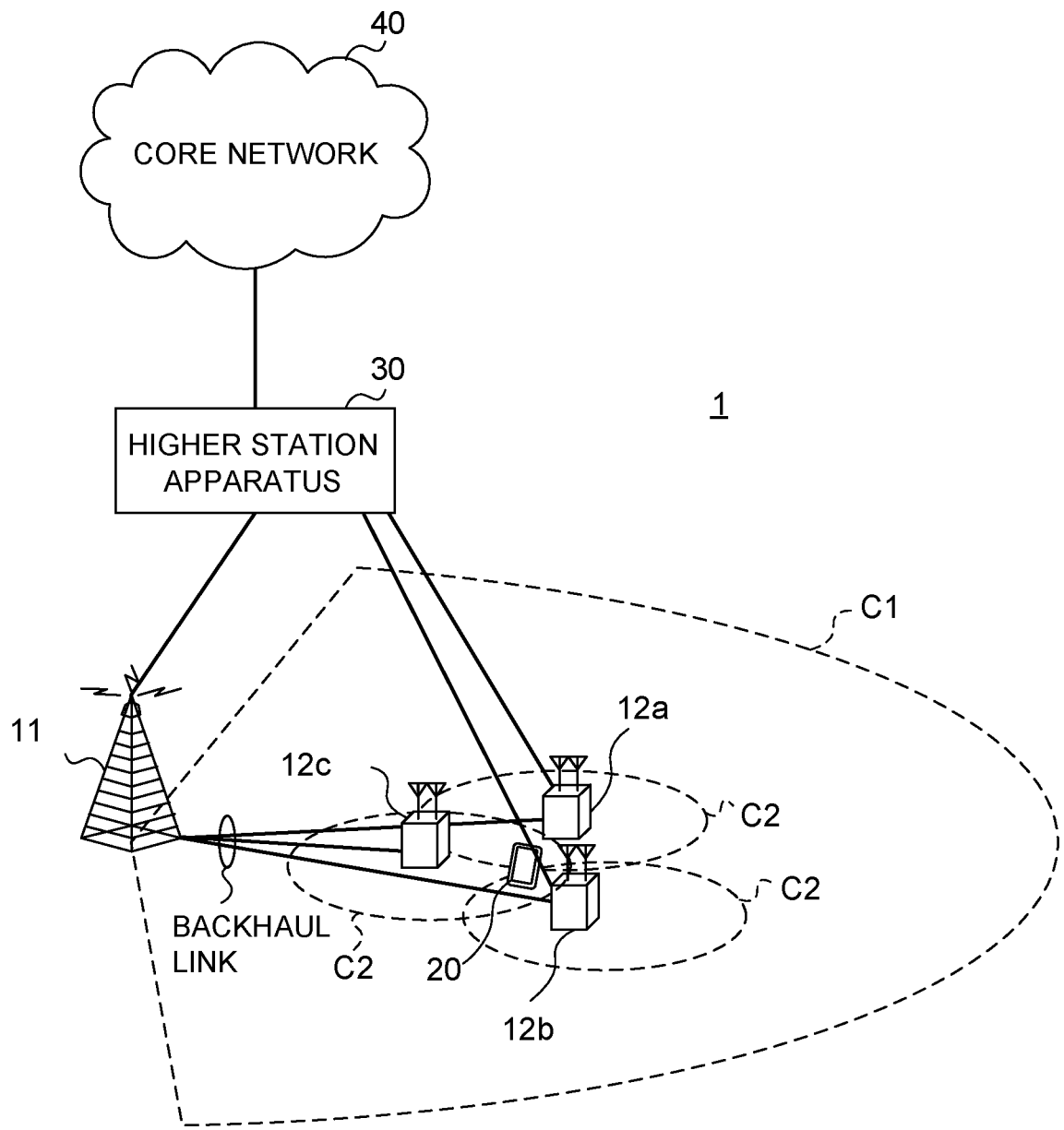
FIG. 15 is a diagram to show an example of a schematic structure of a radio communication system according to one embodiment.

FIG. 15 is a diagram to show an example of a schematic structure of the radio communication system according to one embodiment. A radio communication system 1 can adopt at least one of carrier aggregation (CA) and dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a base station 11 that forms a macro cell C1 of a relatively wide coverage, and base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the base station 11 and the base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the base stations 12, a carrier of a relatively high frequency band (for example, 3.5 GHz, 5 GHz, and so on) and a wide bandwidth may be used, or the same carrier as that used between the user terminals 20 and the base station 11 may be used. Note that the structure of the frequency band for use in each base station is by no means limited to these.

The user terminals 20 can perform communication by using at least one of time division duplex (TDD) and frequency division duplex (FDD) in each cell. Furthermore, in each cell (carrier), a single numerology may be employed, or a plurality of different numerologies may be employed.

Numerologies may be communication parameters applied to at least one of transmission and reception of a certain signal and channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on.

For example, when at least one of the subcarrier spacing of constituting OFDM symbols and the number of OFDM symbols is different regarding certain physical channels, this case may be described that numerologies are different.

A wired connection (for example, means in compliance with the CPRI (Common Public Radio Interface) such as an optical fiber, an X2 interface and so on) or a wireless connection may be established between the base station 11 and the base stations 12 (or between two base stations 12).

The base station 11 and the base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each base station 12 may be connected with the higher station apparatus via the base station 11.

Note that the base station 11 is a base station having a relatively wide coverage, and may be referred to as a "macro base station," a "central node," an "eNB (eNodeB)," a "transmitting/receiving point" and so on. The base stations 12 are base stations having local coverages, and may be referred to as "small base stations," "micro base stations,"

"pico base stations," "femto base stations," "HeNBs (Home eNodeBs)," "RRHs (Remote Radio Heads)," "transmitting/receiving points" and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and at least one of single carrier frequency division multiple access (SC-FDMA) and OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink control channels and so on, are used as downlink channels. User data, higher layer control information, SIBs (System Information Blocks) and so on are communicated on the PDSCH. The MIBs (Master Information Blocks) are communicated on the PBCH.

The downlink control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including scheduling information of at least one of the PDSCH and PUSCH, and so on are communicated on the PDCCH.

Note that the DCI scheduling DL data reception may be referred to as "DL assignment," and the DCI scheduling UL data transmission may be referred to as "UL grant."

The number of OFDM symbols to use for the PDCCH may be communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH may be transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Base Station)

Figure 16:
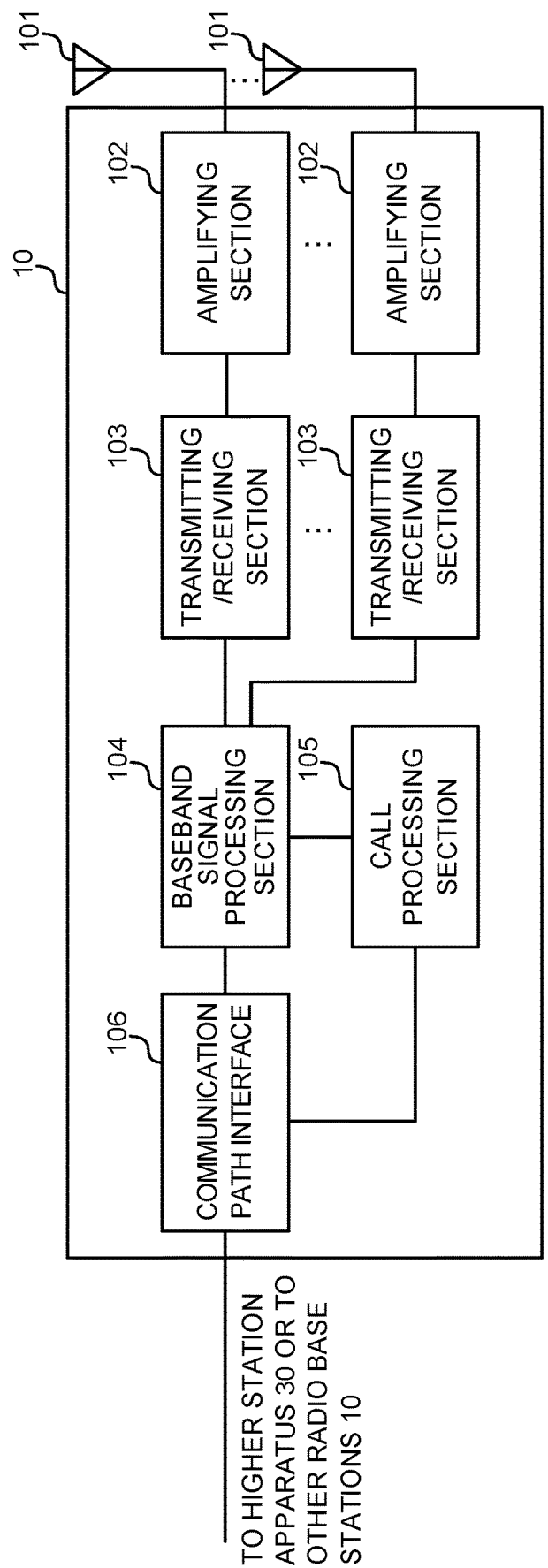
FIG. 16 is a diagram to show an example of an overall structure of a base station according to one embodiment.

FIG. 16 is a diagram to show an example of an overall structure of the base station according to one embodiment. A base station 10 includes a plurality of transmitting/receiving antennas 101, amplifying sections 102, transmitting/receiving sections 103, a baseband signal processing section 104, a call processing section 105 and a communication path interface 106. Note that the base station 10 may be configured to include one or more transmitting/receiving antennas 101, one or more amplifying sections 102 and one or more transmitting/receiving sections 103.

User data to be transmitted from the base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other base stations 10 via an inter-base station interface (for example, an optical fiber in compliance with the CPRI (Common Public Radio Interface) and an X2 interface).

Figure 17:
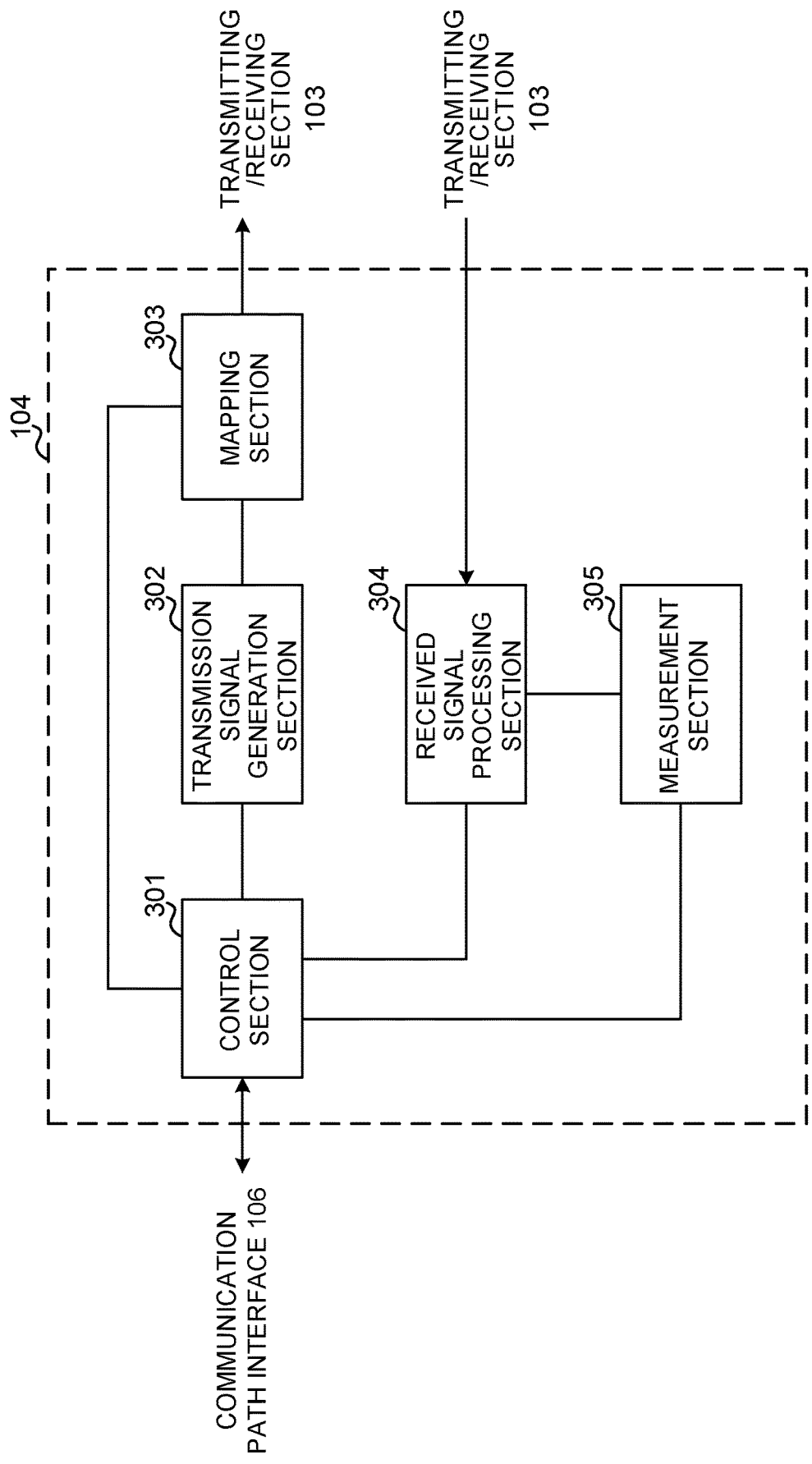
FIG. 17 is a diagram to show an example of a functional structure of the base station according to one embodiment.

FIG. 17 is a diagram to show an example of a functional structure of the base station according to one embodiment. Note that, the present example primarily shows functional blocks that pertain to characteristic parts of the present embodiment, and it is assumed that the base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the base station 10, and some or all of the structures do not need to be included in the baseband signal processing section 104.

The control section (scheduler) 301 controls the whole of the base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted by using a downlink shared channel), and a downlink control signal (for example, a signal transmitted by using a downlink control channel). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls scheduling of an uplink data signal (for example, a signal transmitted by using an uplink shared channel), an uplink control signal (for example, a signal transmitted by using an uplink control channel), a random access preamble, an uplink reference signal, and the like.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates at least one of DL assignment to report assignment information of downlink data and UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs at least one of the received signals and the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal. The measurement section 305 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 301.

Note that the transmitting/receiving section 103 may transmit the signal for beam measurement to the user terminal 20. The transmitting/receiving section 103 may receive, from the user terminal 20, a (periodic, semi-persistent, or aperiodic) beam report including information related to measurement results of the signal for beam measurement.

The transmitting/receiving section 103 may receive an uplink signal (the PUCCH, the PUSCH, the SRS, or the like) that is transmitted by using a sequence (the sequence, the scrambling sequence, the initial value of the scrambling sequence, or the like based on at least one of the DMRS sequence, the sequence index, and the CS index) corresponding to information (the 1-bit information or the multiple-bit information, or the information in which the 1-bit information or the multiple-bit information and the UL data or the UCI are multiplexed) including whether change of a beam (the base station transmit beam, the base station receive beam, the UE transmit beam, or the UE receive beam) is necessary.

The control section 301 may determine the information, based on the uplink signal.

The control section 301 may determine one of a first sequence (for example, the first CS index) corresponding to no need for the change of the beam and a second sequence (for example, the second CS index) corresponding to need for the change of the beam, based on the uplink signal.

The first sequence and the second sequence may be based on the same reference sequence (base sequence). The interval between the cyclic shift applied to the first sequence and the cyclic shift applied to the second sequence may be $\pi$ (the interval between the CS derivation parameters (for example, $m_{CS}$) may be 6).

The control section 301 may perform channel estimation by using the determined sequence (DMRS sequence).

The control section 301 may perform channel estimation by using specific elements (elements of even-numbered RE indices) of frequency resources of the uplink signal.

(User Terminal)

Figure 18:
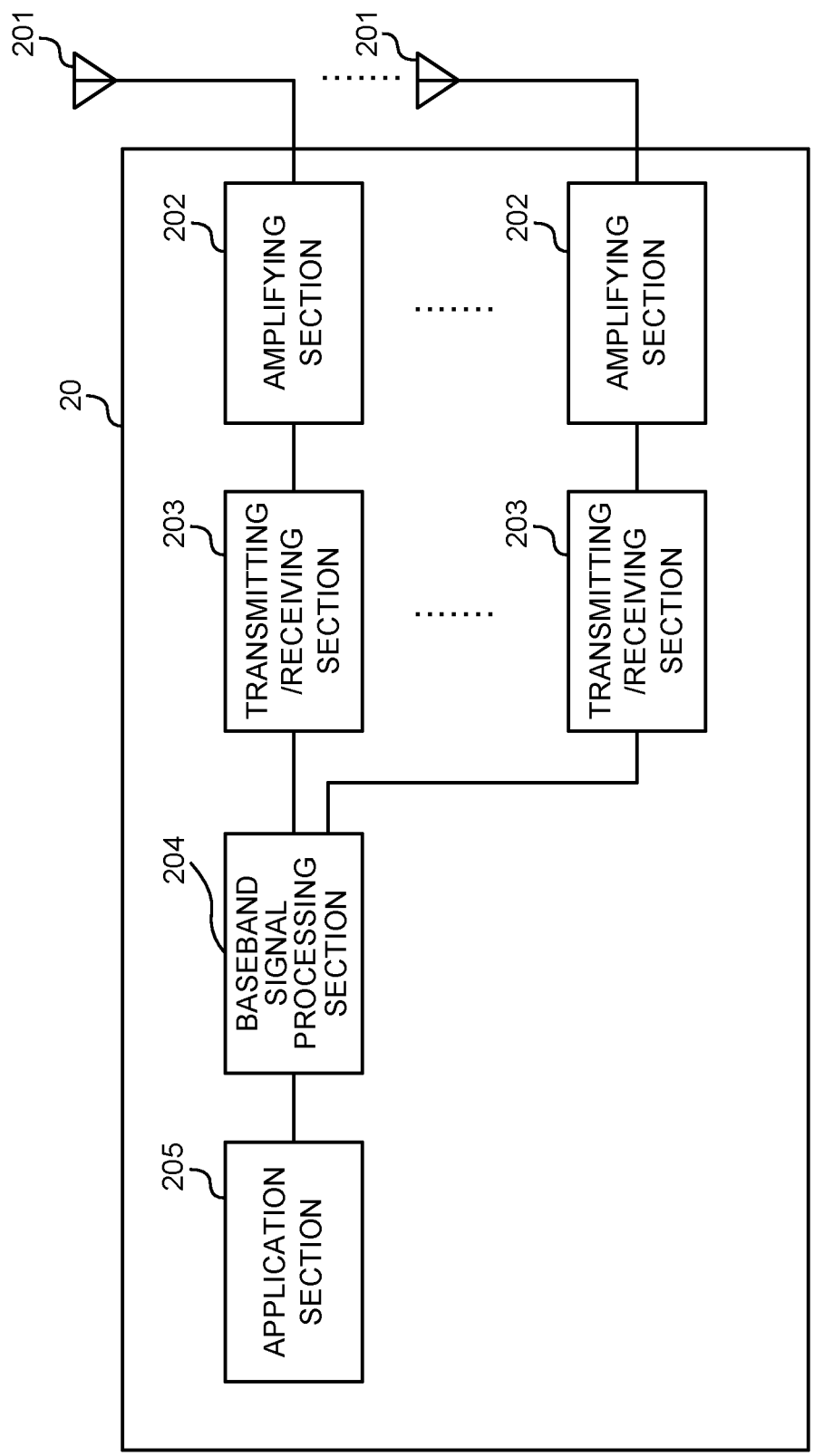
FIG. 18 is a diagram to show an example of an overall structure of a user terminal according to one embodiment.

FIG. 18 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Figure 19:
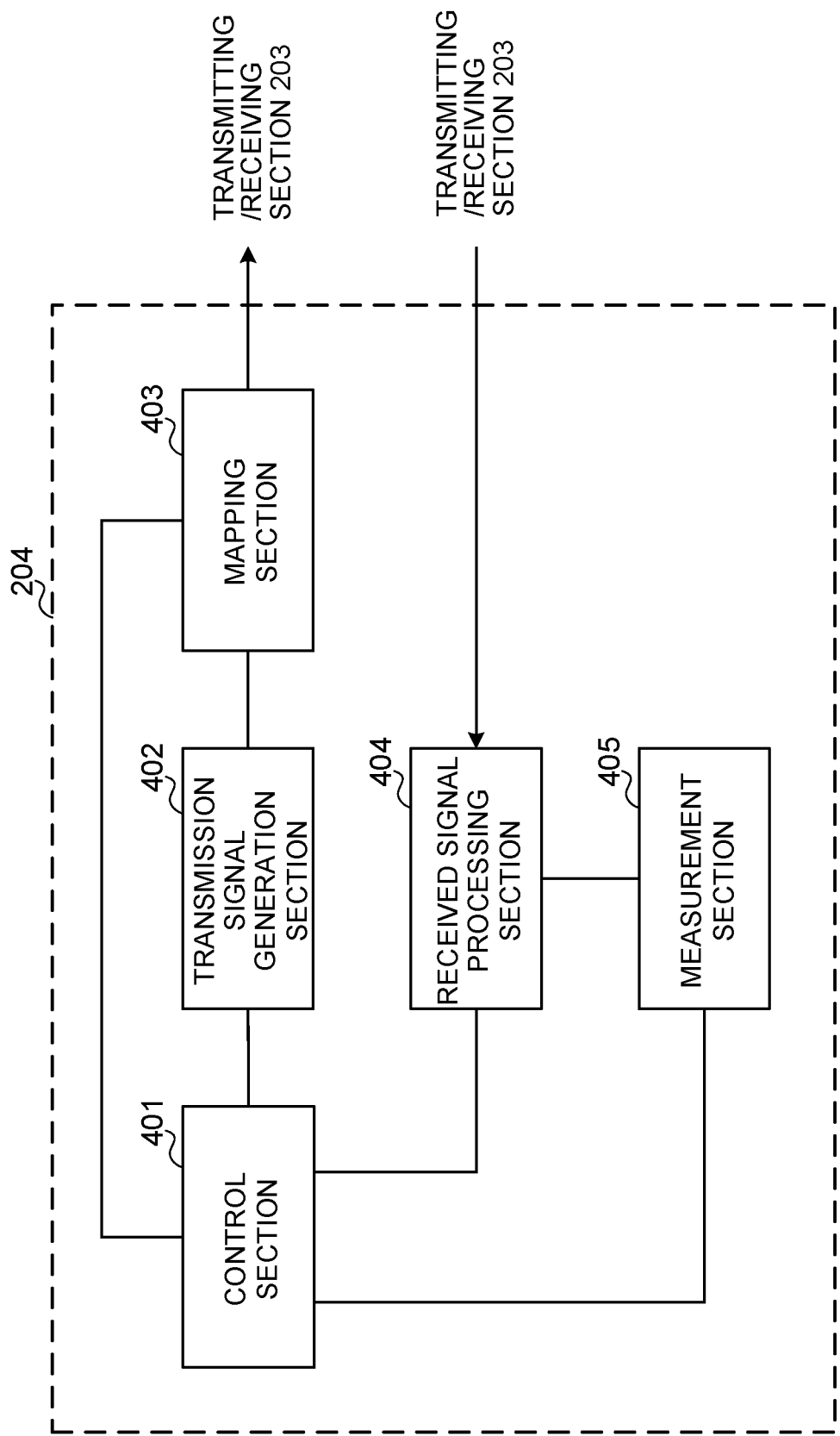
FIG. 19 is a diagram to show an example of a functional structure of the user terminal according to one embodiment.

FIG. 19 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal, a downlink data signal, and so on transmitted from the base station 10, from the received signal processing section 404. The control section 401 controls generation of an uplink control signal, an uplink data signal, and so on, based on results obtained as a result of determining whether or not retransmission control for the downlink data signal is required, the downlink control signal, and so on.

If the control section 401 acquires a variety of information reported by the base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs at least one of the received signals and the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains. The measurement section 405 may configure at least a part of the receiving section according to the present disclosure.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Note that the transmitting/receiving section 203 and the measurement section 405 may perform measurement based on the received signal for beam measurement. The transmitting/receiving section 203 may transmit, to the base station 10, a (periodic, semi-persistent, or aperiodic) beam report including information related to results of the measurement.

The transmitting/receiving section 203 may transmit an uplink signal based on information including whether change of a beam (the base station transmit beam, the base station receive beam, the UE transmit beam, or the UE receive beam) is necessary.

The control section 401 may use, for the uplink signal, a sequence (the sequence, the scrambling sequence, the initial value of the scrambling sequence, or the like based on at least one of the DMRS sequence, the sequence index, and the CS index) corresponding to information including whether change of a beam is necessary.

The control section 401 may use, for the uplink signal, one of a sequence corresponding to no need for the change of the beam (for example, the 1-bit information "0") and a sequence corresponding to need for the change of the beam (for example, the 1-bit information "1"), based on results of measurement.

The information may be associated with at least one of the sequence index, the cyclic shift index, the scrambling sequence index, the initial value of the scrambling sequence.

The control section 401 may assume that the beam is not changed from when the uplink signal is transmitted to when certain time (for example, $T_{offset}$) has elapsed.

When the information indicates that the change of the beam is unnecessary, the control section 401 may not perform a configured report (the P-CSI, the SP-CSI, the A-CSI, or the like) from when the uplink signal is transmitted to when certain time (for example, $T_{offset}$) has elapsed.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software with the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but functions are by no means limited to these. For example, functional block (components) to implement a function of transmission may be referred to as a "transmitting section (transmitting unit)," a "transmitter," and the like. The method for implementing each component is not particularly limited as described above.

Figure 20:
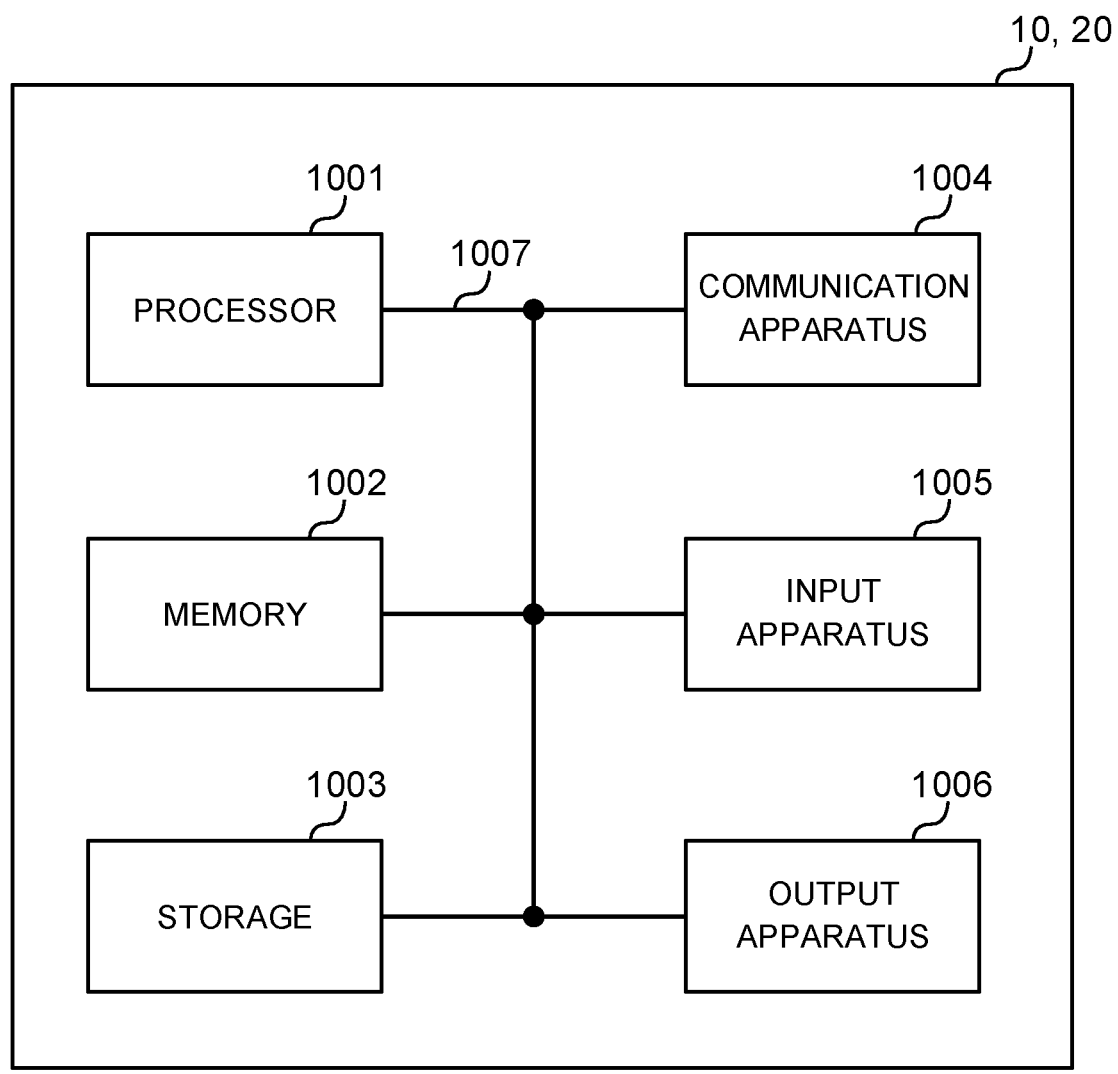
FIG. 20 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 20 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. In the transmitting/receiving section 103, the transmitting section 103*a* and the receiving section 103*b* can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. Since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as "precoding," a "precoder," a "weight (precoding wait)," "quasi-co-location (QCL)," a "TCI state (Transmission Configuration Indication state)," a "spatial relation," a "spatial domain filter," a "transmit power," "phase rotation," an "antenna port," an "antenna port group," a "layer," "the number of layers," a "rank," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. Note that at least one of a base station and a mobile station may be a device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, next-generation systems that are enhanced based on these, and so on. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, and so on, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B are each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that determines a value indicating a cyclic shift, based on:
a physical resource block (PRB) index numbered in a bandwidth part (BWP), a PRB of the PRB index being a unit of resource allocation in a frequency domain and being numbered in the BWP, and
a symbol index of a physical uplink control channel (PUCCH) on which a demodulation reference signal (DMRS) is multiplexed and on which a scheduling request of 1-bit information for beam switching is transmitted, the symbol index being in a time domain; and
a transmitter that transmits, on the PUCCH based on the value indicating the cyclic shift, the scheduling request, which is the 1-bit information, for beam switching and the DMRS on the PUCCH,
wherein the PUCCH uses a sequence generated by using the value indicating the cyclic shift.

2. A radio communication method for a terminal, comprising:
determining a value indicating a cyclic shift, based on:
a physical resource block (PRB) index numbered in a bandwidth part (BWP), a PRB of the PRB index being a unit of resource allocation in a frequency domain and being numbered in the BWP, and
a symbol index of a physical uplink control channel (PUCCH) on which a demodulation reference signal (DMRS) is multiplexed and on which a scheduling request of 1-bit information for beam switching is transmitted, the symbol index being in a time domain; and
transmitting, on the PUCCH based on the value indicating the cyclic shift, the scheduling request, which is the 1-bit information, for beam switching and the DMRS on the PUCCH,
wherein the PUCCH uses a sequence generated by using the value indicating the cyclic shift.

3. A system comprising a terminal and a base station, wherein
the terminal comprises:
a processor that determines a value indicating a cyclic shift, based on:
a physical resource block (PRB) index numbered in a bandwidth part (BWP), a PRB of the PRB index being a unit of resource allocation in a frequency domain and being numbered in the BWP, and
a symbol index of a physical uplink control channel (PUCCH) on which a demodulation reference signal (DMRS) is multiplexed and on which a scheduling request of 1-bit information for beam switching is transmitted, the symbol index being in a time domain; and
a transmitter that transmits, on the PUCCH based on the value indicating the cyclic shift, the scheduling request, which is the 1-bit information, for beam switching and the DMRS on the PUCCH,
wherein the PUCCH uses a sequence generated by using the value indicating the cyclic shift, and
the base station comprises:
a receiver that receives the PUCCH.

* * * * *